(12) United States Patent
Kumar et al.

(10) Patent No.: US 11,977,923 B2
(45) Date of Patent: *May 7, 2024

(54) CLOUD-BASED SCALE-UP SYSTEM COMPOSITION

(71) Applicant: Intel Corporation, Santa Clara, CA (US)

(72) Inventors: Mohan J. Kumar, Aloha, OR (US); Murugasamy K. Nachimuthu, Beaverton, OR (US); Krishna Bhuyan, Sammamish, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/103,739

(22) Filed: Jan. 31, 2023

(65) Prior Publication Data

US 2023/0176919 A1 Jun. 8, 2023

Related U.S. Application Data

(63) Continuation of application No. 17/246,388, filed on Apr. 30, 2021, now Pat. No. 11,630,702, which is a (Continued)

(30) Foreign Application Priority Data

Aug. 30, 2017 (IN) .............................. 201741030632

(51) Int. Cl.
*G06F 9/50* (2006.01)
*G06F 3/06* (2006.01)
(Continued)

(52) U.S. Cl.
CPC ............ *G06F 9/505* (2013.01); *G06F 3/0604* (2013.01); *G06F 3/0608* (2013.01);
(Continued)

(58) Field of Classification Search
CPC ..... G06F 9/505; G06F 11/0709; G06F 9/5083
See application file for complete search history.

(56) References Cited

U.S. PATENT DOCUMENTS 6,085,295 A 7/2000 Ekanadham et al.
6,104,696 A 8/2000 Kadambi et al.
(Continued)

FOREIGN PATENT DOCUMENTS

CN 1468007 1/2004
CN 1816003 8/2006
(Continued)

OTHER PUBLICATIONS

International Preliminary Report on Patentability for PCT Application No. PCT/US2017/063765, dated Jun. 4, 2019.
(Continued)

*Primary Examiner* — Benjamin C Wu
(74) *Attorney, Agent, or Firm* — Essential Patents Group, LLP; Christopher K. Gagne

(57) ABSTRACT

Technologies for composing a managed node with multiple processors on multiple compute sleds to cooperatively execute a workload include a memory, one or more processors connected to the memory, and an accelerator. The accelerator further includes a coherence logic unit that is configured to receive a node configuration request to execute a workload. The node configuration request identifies the compute sled and a second compute sled to be included in a managed node. The coherence logic unit is further configured to modify a portion of local working data associated with the workload on the compute sled in the memory with the one or more processors of the compute sled, determine coherence data indicative of the modification made by the one or more processors of the compute sled to the local (Continued)

working data in the memory, and send the coherence data to the second compute sled of the managed node.

12 Claims, 16 Drawing Sheets

Related U.S. Application Data continuation of application No. 16/344,582, filed as application No. PCT/US2017/063756 on Nov. 29, 2017, now Pat. No. 11,016,832.

(60) Provisional application No. 62/584,401, filed on Nov. 10, 2017, provisional application No. 62/427,268, filed on Nov. 29, 2016.

(51) Int. Cl.

| | |
|---|---|
| *G06F 7/06* | (2006.01) |
| *G06F 8/65* | (2018.01) |
| *G06F 8/654* | (2018.01) |
| *G06F 8/656* | (2018.01) |
| *G06F 8/658* | (2018.01) |
| *G06F 9/38* | (2018.01) |
| *G06F 9/4401* | (2018.01) |
| *G06F 9/455* | (2018.01) |
| *G06F 9/48* | (2006.01) |
| *G06F 9/54* | (2006.01) |
| *G06F 11/07* | (2006.01) |
| *G06F 11/30* | (2006.01) |
| *G06F 11/34* | (2006.01) |
| *G06F 12/02* | (2006.01) |
| *G06F 12/06* | (2006.01) |
| *G06F 13/16* | (2006.01) |
| *G06F 16/174* | (2019.01) |
| *G06F 21/57* | (2013.01) |
| *G06F 21/62* | (2013.01) |
| *G06F 21/73* | (2013.01) |
| *G06F 21/76* | (2013.01) |
| *G06T 1/20* | (2006.01) |
| *G06T 1/60* | (2006.01) |
| *G06T 9/00* | (2006.01) |
| *H01R 13/453* | (2006.01) |
| *H01R 13/631* | (2006.01) |
| *H03K 19/173* | (2006.01) |
| *H03M 7/30* | (2006.01) |
| *H03M 7/40* | (2006.01) |
| *H03M 7/42* | (2006.01) |
| *H04L 9/08* | (2006.01) |
| *H04L 12/28* | (2006.01) |
| *H04L 12/46* | (2006.01) |
| *H04L 41/044* | (2022.01) |
| *H04L 41/0816* | (2022.01) |
| *H04L 41/0853* | (2022.01) |
| *H04L 41/12* | (2022.01) |
| *H04L 43/04* | (2022.01) |
| *H04L 43/06* | (2022.01) |
| *H04L 43/08* | (2022.01) |
| *H04L 43/0894* | (2022.01) |
| *H04L 47/20* | (2022.01) |
| *H04L 47/2441* | (2022.01) |
| *H04L 49/104* | (2022.01) |
| *H04L 61/5007* | (2022.01) |
| *H04L 67/10* | (2022.01) |
| *H04L 67/1014* | (2022.01) |
| *H04L 67/63* | (2022.01) |
| *H04L 67/75* | (2022.01) |
| *H05K 7/14* | (2006.01) |
| *G06F 11/14* | (2006.01) |
| *G06F 15/80* | (2006.01) |
| *G06F 16/28* | (2019.01) |
| *H04L 9/40* | (2022.01) |
| *H04L 41/046* | (2022.01) |
| *H04L 41/0896* | (2022.01) |
| *H04L 41/142* | (2022.01) |
| *H04L 47/78* | (2022.01) |
| *H04Q 11/00* | (2006.01) |

(52) U.S. Cl.
CPC .......... *G06F 3/0611* (2013.01); *G06F 3/0613* (2013.01); *G06F 3/0617* (2013.01); *G06F 3/0641* (2013.01); *G06F 3/0647* (2013.01); *G06F 3/065* (2013.01); *G06F 3/0653* (2013.01); *G06F 3/067* (2013.01); *G06F 7/06* (2013.01); *G06F 8/65* (2013.01); *G06F 8/654* (2018.02); *G06F 8/656* (2018.02); *G06F 8/658* (2018.02); *G06F 9/3851* (2013.01); *G06F 9/3891* (2013.01); *G06F 9/4401* (2013.01); *G06F 9/45533* (2013.01); *G06F 9/4843* (2013.01); *G06F 9/4881* (2013.01); *G06F 9/5005* (2013.01); *G06F 9/5038* (2013.01); *G06F 9/5044* (2013.01); *G06F 9/5083* (2013.01); *G06F 9/544* (2013.01); *G06F 11/0709* (2013.01); *G06F 11/0751* (2013.01); *G06F 11/079* (2013.01); *G06F 11/3006* (2013.01); *G06F 11/3034* (2013.01); *G06F 11/3055* (2013.01); *G06F 11/3079* (2013.01); *G06F 11/3409* (2013.01); *G06F 12/0284* (2013.01); *G06F 12/0692* (2013.01); *G06F 13/1652* (2013.01); *G06F 16/1744* (2019.01); *G06F 21/57* (2013.01); *G06F 21/6218* (2013.01); *G06F 21/73* (2013.01); *G06F 21/76* (2013.01); *G06T 1/20* (2013.01); *G06T 1/60* (2013.01); *G06T 9/005* (2013.01); *H01R 13/453* (2013.01); *H01R 13/4536* (2013.01); *H01R 13/4538* (2013.01); *H01R 13/631* (2013.01); *H03K 19/1731* (2013.01); *H03M 7/3084* (2013.01); *H03M 7/40* (2013.01); *H03M 7/42* (2013.01); *H03M 7/60* (2013.01); *H03M 7/6011* (2013.01); *H03M 7/6017* (2013.01); *H03M 7/6029* (2013.01); *H04L 9/0822* (2013.01); *H04L 12/2881* (2013.01); *H04L 12/4633* (2013.01); *H04L 41/044* (2013.01); *H04L 41/0816* (2013.01); *H04L 41/0853* (2013.01); *H04L 41/12* (2013.01); *H04L 43/04* (2013.01); *H04L 43/06* (2013.01); *H04L 43/08* (2013.01); *H04L 43/0894* (2013.01); *H04L 47/20* (2013.01); *H04L 47/2441* (2013.01); *H04L 49/104* (2013.01); *H04L 61/5007* (2022.05); *H04L 67/10* (2013.01); *H04L 67/1014* (2013.01); *H04L 67/63* (2022.05); *H04L 67/75* (2022.05); *H05K 7/1452* (2013.01); *H05K 7/1487* (2013.01); *H05K 7/1491* (2013.01); *G06F 11/1453* (2013.01); *G06F 12/023* (2013.01); *G06F 15/80* (2013.01); *G06F 16/285* (2019.01); *G06F 2212/401* (2013.01); *G06F 2212/402* (2013.01); *G06F 2221/2107* (2013.01); *H04L 41/046* (2013.01); *H04L 41/0896* (2013.01); *H04L 41/142* (2013.01); *H04L 47/78* (2013.01); *H04L 63/1425*

(2013.01); *H04Q 11/0005* (2013.01); *H05K 7/1447* (2013.01); *H05K 7/1492* (2013.01)

(56) References Cited

U.S. PATENT DOCUMENTS

| | | | |
|---|---|---|---|
| 6,115,372 A | 9/2000 | Dinha | |
| 6,353,885 B1 | 3/2002 | Herzi et al. | |
| 6,367,018 B1 | 4/2002 | Jain | |
| 6,650,620 B1* | 11/2003 | Neogi | H04L 67/63 370/231 |
| 7,415,022 B2 | 8/2008 | Kadambi et al. | |
| 7,739,677 B1 | 6/2010 | Kekre et al. | |
| 7,835,388 B2 | 11/2010 | Hu | |
| 7,962,736 B1 | 6/2011 | Polyudov | |
| 8,248,928 B1 | 8/2012 | Wang et al. | |
| 8,788,663 B1 | 7/2014 | Adogla et al. | |
| 8,812,765 B2 | 8/2014 | Dai et al. | |
| 9,026,765 B1 | 5/2015 | Marshak et al. | |
| 9,042,402 B1 | 5/2015 | Loganathan et al. | |
| 9,143,406 B2 | 9/2015 | Waggener et al. | |
| 9,253,055 B2 | 2/2016 | Nelke et al. | |
| 9,612,767 B2 | 4/2017 | Huang et al. | |
| 9,733,980 B1 | 8/2017 | Khan et al. | |
| 9,859,918 B1 | 1/2018 | Gopal | |
| 9,893,988 B2 | 2/2018 | Agarwal et al. | |
| 9,929,747 B2 | 3/2018 | Gopal | |
| 9,936,613 B2 | 4/2018 | Adiletta | |
| 9,954,552 B2 | 4/2018 | Gopal | |
| 9,973,207 B2 | 5/2018 | Gopal | |
| 10,033,404 B2 | 7/2018 | Cutter | |
| 10,034,407 B2 | 7/2018 | Miller | |
| 10,045,098 B2 | 8/2018 | Adiletta | |
| 10,070,207 B2 | 9/2018 | Adiletta et al. | |
| 10,085,358 B2 | 9/2018 | Adiletta | |
| 10,091,904 B2 | 10/2018 | Miller | |
| 10,116,327 B2 | 10/2018 | Cutter | |
| 10,191,684 B2 | 1/2019 | Gopal et al. | |
| 10,234,833 B2 | 3/2019 | Ahuja | |
| 10,263,637 B2 | 4/2019 | Gopal | |
| 10,268,412 B2 | 4/2019 | Guilford | |
| 10,313,769 B2 | 6/2019 | Miller | |
| 10,334,334 B2 | 6/2019 | Miller | |
| 10,348,327 B2 | 7/2019 | Adiletta | |
| 10,349,152 B2 | 7/2019 | Adiletta | |
| 10,356,495 B2 | 7/2019 | Adiletta | |
| 10,368,148 B2 | 7/2019 | Kumar | |
| 10,390,114 B2 | 8/2019 | Schmisseur | |
| 10,397,670 B2 | 8/2019 | Gorius | |
| 10,411,729 B2 | 9/2019 | Miller | |
| 10,448,126 B2 | 10/2019 | Gilsdorf | |
| 10,461,774 B2 | 10/2019 | Balle | |
| 10,469,252 B2 | 11/2019 | Schmisseur | |
| 10,474,460 B2 | 11/2019 | Adiletta | |
| 10,476,670 B2 | 11/2019 | Schmisseur | |
| 10,489,156 B2 | 11/2019 | Munoz | |
| 10,542,333 B2 | 1/2020 | Miller | |
| 10,963,176 B2 | 3/2021 | Balle et al. | |
| 10,990,309 B2 | 4/2021 | Guim Bernat et al. | |
| 11,029,870 B2 | 6/2021 | Balle et al. | |
| 11,128,553 B2 | 9/2021 | Adiletta et al. | |
| 11,507,430 B2* | 11/2022 | Subramanian | G06N 3/04 |
| 11,630,702 B2* | 4/2023 | Kumar | H04L 41/0853 718/104 |
| 2003/0026525 A1 | 2/2003 | Alvarez | |
| 2003/0028594 A1 | 2/2003 | Laschkewitsch et al. | |
| 2004/0205304 A1 | 10/2004 | McKenney et al. | |
| 2005/0135231 A1 | 6/2005 | Bellovin | |
| 2006/0036719 A1 | 2/2006 | Bodin et al. | |
| 2006/0059492 A1* | 3/2006 | Fellenstein | G06Q 40/04 718/104 |
| 2006/0168337 A1 | 7/2006 | Stahl et al. | |
| 2006/0184670 A1 | 8/2006 | Beeson et al. | |
| 2006/0239270 A1 | 10/2006 | Yao et al. | |
| 2007/0147400 A1 | 6/2007 | Hu | |
| 2008/0075071 A1 | 3/2008 | Beshai | |
| 2008/0229318 A1 | 9/2008 | Franke | |
| 2009/0198792 A1 | 8/2009 | Wittenschlaeger | |
| 2010/0191823 A1 | 7/2010 | Archer et al. | |
| 2011/0185125 A1 | 7/2011 | Jain et al. | |
| 2011/0228767 A1 | 9/2011 | Singla et al. | |
| 2011/0296231 A1 | 12/2011 | Dake | |
| 2012/0054770 A1 | 3/2012 | Krishnamurthy et al. | |
| 2012/0099863 A1 | 4/2012 | Xu et al. | |
| 2012/0207139 A1 | 8/2012 | Husted et al. | |
| 2012/0230343 A1 | 9/2012 | Schrum, Jr. | |
| 2012/0303885 A1 | 11/2012 | Jeddeloh | |
| 2013/0159638 A1 | 6/2013 | Koinuma et al. | |
| 2013/0179485 A1 | 7/2013 | Chapman et al. | |
| 2013/0232495 A1 | 9/2013 | Rossbach et al. | |
| 2013/0297769 A1 | 11/2013 | Chang et al. | |
| 2013/0325998 A1 | 12/2013 | Hormuth et al. | |
| 2014/0012961 A1 | 1/2014 | Pope | |
| 2014/0047272 A1 | 2/2014 | Breternitz et al. | |
| 2014/0047341 A1 | 2/2014 | Breternitz et al. | |
| 2014/0359044 A1 | 12/2014 | Davis et al. | |
| 2015/0007182 A1 | 1/2015 | Rossbach et al. | |
| 2015/0106804 A1 | 4/2015 | Chandrashekhar et al. | |
| 2015/0229529 A1 | 8/2015 | Engebretsen | |
| 2015/0281065 A1 | 10/2015 | Liljenstolpe | |
| 2015/0333824 A1 | 11/2015 | Swinkels et al. | |
| 2015/0334867 A1 | 11/2015 | Faw et al. | |
| 2015/0381426 A1 | 12/2015 | Roese et al. | |
| 2016/0050194 A1 | 2/2016 | Rachmiel | |
| 2016/0087847 A1 | 3/2016 | Krithivas et al. | |
| 2016/0118121 A1 | 4/2016 | Kelly et al. | |
| 2016/0127191 A1 | 5/2016 | Nair | |
| 2016/0147592 A1 | 5/2016 | Guddeti | |
| 2016/0162281 A1 | 6/2016 | Hokiyama | |
| 2016/0164739 A1 | 6/2016 | Skalecki | |
| 2016/0231939 A1 | 8/2016 | Cannata et al. | |
| 2016/0234580 A1 | 8/2016 | Clarke et al. | |
| 2016/0306677 A1 | 10/2016 | Hira et al. | |
| 2017/0046179 A1 | 2/2017 | Teh et al. | |
| 2017/0070431 A1 | 3/2017 | Nidumolu et al. | |
| 2017/0076195 A1* | 3/2017 | Yang | G06N 3/045 |
| 2017/0093756 A1 | 3/2017 | Bernat et al. | |
| 2017/0116004 A1 | 4/2017 | Devegowda et al. | |
| 2017/0150621 A1 | 5/2017 | Breakstone et al. | |
| 2017/0185786 A1 | 6/2017 | Ylinen et al. | |
| 2017/0199746 A1 | 7/2017 | Nguyen et al. | |
| 2017/0223436 A1 | 8/2017 | Moynihan et al. | |
| 2017/0251077 A1 | 8/2017 | Eerpini et al. | |
| 2017/0257970 A1 | 9/2017 | Alleman et al. | |
| 2017/0279705 A1 | 9/2017 | Lin et al. | |
| 2017/0315798 A1 | 11/2017 | Shivanna et al. | |
| 2017/0317945 A1 | 11/2017 | Guo et al. | |
| 2017/0329860 A1 | 11/2017 | Jones | |
| 2018/0004835 A1* | 1/2018 | Piechowicz | G06F 16/20 |
| 2018/0014306 A1 | 1/2018 | Adiletta | |
| 2018/0014757 A1 | 1/2018 | Kumar | |
| 2018/0017700 A1 | 1/2018 | Adiletta | |
| 2018/0020054 A1* | 1/2018 | Woodacre | H04L 67/1097 |
| 2018/0024578 A1 | 1/2018 | Ahuja | |
| 2018/0024739 A1 | 1/2018 | Schmisseur | |
| 2018/0024740 A1 | 1/2018 | Miller | |
| 2018/0024752 A1 | 1/2018 | Miller | |
| 2018/0024756 A1 | 1/2018 | Miller | |
| 2018/0024764 A1 | 1/2018 | Miller | |
| 2018/0024771 A1 | 1/2018 | Miller | |
| 2018/0024775 A1 | 1/2018 | Miller | |
| 2018/0024776 A1 | 1/2018 | Miller | |
| 2018/0024838 A1 | 1/2018 | Nachimuthu | |
| 2018/0024860 A1 | 1/2018 | Balle | |
| 2018/0024861 A1 | 1/2018 | Balle | |
| 2018/0024864 A1 | 1/2018 | Wilde | |
| 2018/0024867 A1 | 1/2018 | Gilsdorf | |
| 2018/0024932 A1 | 1/2018 | Nachimuthu et al. | |
| 2018/0024947 A1 | 1/2018 | Miller | |
| 2018/0024957 A1 | 1/2018 | Nachimuthu | |
| 2018/0024958 A1 | 1/2018 | Nachimuthu | |
| 2018/0024960 A1 | 1/2018 | Wagh | |
| 2018/0025299 A1 | 1/2018 | Kumar | |
| 2018/0026652 A1 | 1/2018 | Cutter | |
| 2018/0026653 A1 | 1/2018 | Cutter | |
| 2018/0026654 A1 | 1/2018 | Gopal | |

(56) References Cited

U.S. PATENT DOCUMENTS

| | | |
|---|---|---|
| 2018/0026655 A1 | 1/2018 | Gopal |
| 2018/0026656 A1 | 1/2018 | Gopal |
| 2018/0026800 A1 | 1/2018 | Munoz |
| 2018/0026835 A1 | 1/2018 | Nachimuthu |
| 2018/0026849 A1 | 1/2018 | Guim |
| 2018/0026851 A1 | 1/2018 | Adiletta |
| 2018/0026868 A1 | 1/2018 | Guim |
| 2018/0026882 A1 | 1/2018 | Gorius |
| 2018/0026904 A1 | 1/2018 | Van De Groenendaal |
| 2018/0026905 A1 | 1/2018 | Balle et al. |
| 2018/0026906 A1 | 1/2018 | Balle |
| 2018/0026907 A1 | 1/2018 | Miller |
| 2018/0026908 A1 | 1/2018 | Nachimuthu |
| 2018/0026910 A1 | 1/2018 | Balle et al. |
| 2018/0026912 A1 | 1/2018 | Guim |
| 2018/0026913 A1 | 1/2018 | Balle |
| 2018/0026918 A1 | 1/2018 | Kumar |
| 2018/0027055 A1 | 1/2018 | Balle et al. |
| 2018/0027057 A1 | 1/2018 | Balle |
| 2018/0027058 A1 | 1/2018 | Balle et al. |
| 2018/0027059 A1 | 1/2018 | Miller |
| 2018/0027060 A1 | 1/2018 | Metsch et al. |
| 2018/0027062 A1 | 1/2018 | Bernat |
| 2018/0027063 A1 | 1/2018 | Nachimuthu |
| 2018/0027066 A1 | 1/2018 | Van De Groenendaal et al. |
| 2018/0027067 A1 | 1/2018 | Guim |
| 2018/0027093 A1 | 1/2018 | Guim |
| 2018/0027312 A1 | 1/2018 | Adiletta |
| 2018/0027313 A1 | 1/2018 | Adiletta |
| 2018/0027376 A1 | 1/2018 | Kumar |
| 2018/0027679 A1 | 1/2018 | Schmisseur |
| 2018/0027680 A1 | 1/2018 | Kumar |
| 2018/0027682 A1 | 1/2018 | Adiletta |
| 2018/0027684 A1 | 1/2018 | Miller |
| 2018/0027685 A1 | 1/2018 | Miller |
| 2018/0027686 A1 | 1/2018 | Adiletta |
| 2018/0027687 A1 | 1/2018 | Adiletta |
| 2018/0027688 A1 | 1/2018 | Adiletta |
| 2018/0027703 A1 | 1/2018 | Adiletta |
| 2018/0266510 A1 | 1/2018 | Gopal |
| 2018/0067857 A1 | 3/2018 | Wang et al. |
| 2018/0077235 A1 | 3/2018 | Nachimuthu et al. |
| 2018/0150240 A1 | 5/2018 | Guim Bernat et al. |
| 2018/0150256 A1 | 5/2018 | Kumar |
| 2018/0150293 A1 | 5/2018 | Nachimuthu |
| 2018/0150298 A1 | 5/2018 | Balle |
| 2018/0150299 A1 | 5/2018 | Balle |
| 2018/0150330 A1 | 5/2018 | Bernat |
| 2018/0150334 A1 | 5/2018 | Bernat et al. |
| 2018/0150343 A1 | 5/2018 | Bernat |
| 2018/0150372 A1 | 5/2018 | Nachimuthu |
| 2018/0150391 A1 | 5/2018 | Mitchel |
| 2018/0150419 A1 | 5/2018 | Steinmacher-Burow |
| 2018/0150471 A1 | 5/2018 | Gopal |
| 2018/0150644 A1 | 5/2018 | Khanna |
| 2018/0151975 A1 | 5/2018 | Aoki |
| 2018/0152200 A1 | 5/2018 | Guilford |
| 2018/0152201 A1 | 5/2018 | Gopal |
| 2018/0152202 A1 | 5/2018 | Gopal |
| 2018/0152317 A1 | 5/2018 | Chang |
| 2018/0152366 A1 | 5/2018 | Cornett |
| 2018/0152383 A1 | 5/2018 | Burres |
| 2018/0152540 A1 | 5/2018 | Niell |
| 2018/0165199 A1* | 6/2018 | Brandt ............... G06F 12/1009 |
| 2018/0205392 A1 | 7/2018 | Gopal |
| 2018/0293493 A1* | 10/2018 | Kalamkar ............... G06N 3/063 |
| 2019/0014396 A1 | 1/2019 | Adiletta |
| 2019/0021182 A1 | 1/2019 | Adiletta |
| 2019/0034102 A1 | 1/2019 | Miller |
| 2019/0034383 A1 | 1/2019 | Schmisseur |
| 2019/0034490 A1 | 1/2019 | Yap |
| 2019/0035483 A1 | 1/2019 | Schmisseur |
| 2019/0042090 A1 | 2/2019 | Raghunath |
| 2019/0042091 A1 | 2/2019 | Raghunath |
| 2019/0042122 A1 | 2/2019 | Schmisseur |
| 2019/0042126 A1 | 2/2019 | Sen |
| 2019/0042136 A1 | 2/2019 | Nachimuthu |
| 2019/0042234 A1 | 2/2019 | Bernat |
| 2019/0042277 A1 | 2/2019 | Nachimuthu |
| 2019/0042408 A1 | 2/2019 | Schmisseur |
| 2019/0042611 A1 | 2/2019 | Yap |
| 2019/0044809 A1 | 2/2019 | Willis |
| 2019/0044849 A1 | 2/2019 | Ganguli |
| 2019/0044859 A1 | 2/2019 | Sundar |
| 2019/0052457 A1 | 2/2019 | Connor |
| 2019/0062053 A1 | 2/2019 | Jensen |
| 2019/0065083 A1 | 2/2019 | Sen |
| 2019/0065112 A1 | 2/2019 | Schmisseur |
| 2019/0065172 A1 | 2/2019 | Nachimuthu |
| 2019/0065212 A1 | 2/2019 | Kumar |
| 2019/0065231 A1 | 2/2019 | Schmisseur |
| 2019/0065253 A1 | 2/2019 | Bernat |
| 2019/0065260 A1 | 2/2019 | Balle |
| 2019/0065261 A1 | 2/2019 | Narayan |
| 2019/0065281 A1 | 2/2019 | Bernat et al. |
| 2019/0065290 A1 | 2/2019 | Custodio |
| 2019/0065401 A1 | 2/2019 | Dormitzer |
| 2019/0065415 A1 | 2/2019 | Nachimuthu |
| 2019/0067848 A1 | 2/2019 | Aoki |
| 2019/0068444 A1 | 2/2019 | Grecco |
| 2019/0068464 A1 | 2/2019 | Bernat |
| 2019/0068466 A1 | 2/2019 | Chagam |
| 2019/0068509 A1 | 2/2019 | Hyatt |
| 2019/0068521 A1 | 2/2019 | Kumar |
| 2019/0068523 A1 | 2/2019 | Chagam |
| 2019/0068693 A1 | 2/2019 | Bernat |
| 2019/0068696 A1 | 2/2019 | Sen |
| 2019/0068698 A1 | 2/2019 | Kumar |
| 2019/0069433 A1 | 2/2019 | Balle |
| 2019/0069434 A1 | 2/2019 | Aoki |
| 2019/0129874 A1 | 5/2019 | Huang et al. |
| 2019/0196824 A1 | 6/2019 | Liu |
| 2019/0205745 A1* | 7/2019 | Sridharan ............... G06F 9/5061 |
| 2019/0307014 A1 | 10/2019 | Adiletta |
| 2019/0342642 A1 | 11/2019 | Adiletta |
| 2019/0342643 A1 | 11/2019 | Adiletta |
| 2019/0387291 A1 | 12/2019 | Adiletta |
| 2020/0007511 A1 | 1/2020 | Van de Groenendaal et al. |
| 2020/0226027 A1 | 7/2020 | Krasner et al. |
| 2020/0241926 A1 | 7/2020 | Guim Bernat |
| 2020/0341810 A1 | 10/2020 | Ranganathan et al. |
| 2021/0103544 A1* | 4/2021 | Guim Bernat ...... G06F 13/4068 |
| 2021/0209035 A1 | 7/2021 | Galbi et al. |
| 2021/0377140 A1 | 12/2021 | Adiletta |

FOREIGN PATENT DOCUMENTS

| | | |
|---|---|---|
| CN | 103634330 | 3/2014 |
| CN | 105183561 | 12/2015 |
| CN | 105721358 | 6/2016 |
| CN | 105979007 | 9/2016 |
| JP | 2002158733 | 5/2002 |
| WO | 2018102414 | 6/2018 |
| WO | 2018111228 | 6/2018 |
| WO | 2020190801 | 9/2020 |

OTHER PUBLICATIONS

International Search Report and Written Opinion for PCT Application No. PCT/US2017/063756, dated Feb. 23, 2018.
International Search Report and Written Opinion for PCT Application No. PCT/US2021/051801, dated Jan. 3, 2022.
Notice of Allowance for U.S. Appl. No. 16/344,582, dated Jan. 12, 2021.
Notice of Allowance for U.S. Appl. No. 17/246,388, dated Dec. 13, 2022.
Office Action for U.S. Appl. No. 16/344,582, dated Jul. 22, 2020.
Office Action for U.S. Appl. No. 17/246,388, dated Jul. 21, 2022.
"Directory-Based Cache Coherence", Parallel Computer Architecture and Programming, CMU 15-418/15-618, Spring 2019.
Denneman, Frank, "Numa Deep Dive Part 3: Cache Coherency", https://frankdenneman.nl/2016/07/11/numa-deep-dive-part-3-cache-coherency/, Jul. 11, 2016.

(56) References Cited

OTHER PUBLICATIONS

Gorman, Mel, et al., "Optimizing Linux for AMD EPYC 7002 Series Processors with SUSE Linux Enterprise 15 SP1", SUSE Best Practices, Nov. 2019.
Ronciak, John A., et al., "Page-Flip Technology for use within the Linux Networking Stack", Proceedings of the Linux Symposium, vol. Two, Jul. 2004.
Office Action for U.S. Appl. No. 17/221,541, dated Mar. 15, 2023.
Office Action from European Patent Application No. 20217841.4 dated May 25, 2023, 9 pgs.
Communication pursuant to Article 94(3) for European Patent Application No. 18191345.0, dated Apr. 16, 2021.
Corrected Notice of Allowability for U.S. Appl. No. 17/015,479, dated Jun. 3, 2021.
Extended European Search Report for European Patent Application No. 181934.0, dated Feb. 11, 2019.
Extended European Search Report for European Patent Application No. 20217841.4, dated Apr. 16, 2021.
Final Office Action for U.S. Appl. No. 15/719,770, dated Jun. 24, 2020.
International Preliminary Report on Patentability for PCT Application No. PCT/US2017/038552, dated Jan. 22, 2019.
International Search Report and Written Opinion for PCT Application No. PCT/US2017/038552, dated Oct. 11, 2017, 3 pages.
Notice of Allowance for Chinese Patent Application No. 20170038785. 3, dated Jul. 13, 2022.
Notice of Allowance for U.S. Appl. No. 15/395,203, dated Apr. 10, 2018.
Notice of Allowance for U.S. Appl. No. 15/719,770, dated Jun. 17, 2021.
Notice of Allowance for U.S. Appl. No. 15/719,770, dated Mar. 1, 2021.
Notice of Allowance for U.S. Appl. No. 15/721,829, dated Jan. 22, 2021.
Notice of Allowance for U.S. Appl. No. 15/721,829, dated Sep. 11, 2020.
Notice of Allowance for U.S. Appl. No. 16/055,602, dated Feb. 13, 2020.
Notice of Allowance for U.S. Appl. No. 16/055,602, dated Oct. 28, 2019.
Notice of Allowance for U.S. Appl. No. 16/513,345, dated Jun. 5, 2020.
Notice of Allowance for U.S. Appl. No. 16/513,345, dated May 19, 2020.
Notice of Allowance for U.S. Appl. No. 16/513,371, dated Jan. 31, 2020.
Notice of Allowance for U.S. Appl. No. 16/513,371, dated Jun. 5, 2020.
Notice of Allowance for U.S. Appl. No. 16/513,371, dated May 20, 2020.
Notice of Allowance for U.S. Appl. No. 17/015,479, dated May 26, 2021.
Notice of Allowance for U.S. Appl. No. 17/404,749, dated Nov. 9, 2022.
Office Action for U.S. Appl. No. 15/396,014 dated Nov. 4, 2019.
Office Action for U.S. Appl. No. 15/395,203, dated Dec. 1, 2017.
Office Action for U.S. Appl. No. 15/396,014, dated May 10, 2022.
Office Action for U.S. Appl. No. 15/396,014, dated May 14, 2020.
Office Action for U.S. Appl. No. 15/396,014, dated Nov. 3, 2022.
Office Action for U.S. Appl. No. 15/719,770, dated Dec. 27, 2019.
Office Action for U.S. Appl. No. 15/721,829 dated Dec. 23, 2019.
Office Action for U.S. Appl. No. 15/721,829, dated May 13, 2020.
Office Action for U.S. Appl. No. 16/055,602 dated Mar. 27, 2019.
Office Action for U.S. Appl. No. 16/055,602, dated Aug. 15, 2019.
Office Action for U.S. Appl. No. 16/513,345, dated Jan. 31, 2020.
Office Action for U.S. Appl. No. 17/015,479, dated Feb. 12, 2021.
Office Action for U.S. Appl. No. 17/221,541, dated Oct. 25, 2022.
Office Action for U.S. Appl. No. 17/404,749, dated Jul. 27, 2022.
Summons to attend oral proceedings pursuant to Rule 115(1) for European Patent Application No. 18191345.0, dated Aug. 23, 2022.
Translation of Office Action and Search Report for Chinese Patent Application No. 201780038785.3, dated Feb. 18, 2022.
"Secure In-Field Firmware Updates for MSP MCUs", Texas Instruments, Application Report, Nov. 2015.
Artail, et al., "Speedy Cloud: Cloud Computing with Support for Hardware Acceleration Services", 2017 IEEE, pp. 850-865.
Asiatici, et al., "Virtualized Execution Runtime for FPGA Accelerators in the Cloud", 2017 IEEE, pp. 1900-1910.
Burdeniuk, et al., "An Event-Assisted Sequencer to Accelerate Matrix Algorithms", 2010 IEEE, pp. 158-163.
Caulfield, et al., "A Cloud-scale acceleration Architecture", Microsoft Corp., Oct. 2016, 13 pages.
Diamantopoulos, et al., "High-level Synthesizable Dataflow MapReduce Accelerator for FPGA-coupled Data Centers", 2015 IEEE, pp. 26-33.
Ding, et al., "A Unified OpenCL-flavor Programming Model with Scalable Hybrid Hardware Platform on FPGAs", 2014 IEEE, 7 pages.
Fahmy Suhaib, et al., "Virtualized FPGA Accelerators for Efficient Cloud Computing", 2015 IEEE 7th International Conference on Cloud Computing Technology and Science (Cloudcom), IEEE, Nov. 30, 2015, pp. 430-435.
Shade, L.K., "Implementing Secure Remote Firmware Updates", Embedded Systems Conference Silicon Valley, 2011, May 2011.
Non-Final Office Action from U.S. Appl. No. 17/221,541 dated Aug. 1, 2023, 15 pgs.
Non-Final Office Action from U.S. Appl. No. 17/681,025 dated Jun. 23, 2023, 8 pgs.
Non-Final Office Action from U.S. Appl. No. 18/116,957 dated Jun. 30, 2023, 27 pgs.
Office Action from Chinese Patent Application No. 202110060921.7 dated Sep. 11, 2023, 5 pgs.
Final Office Action from U.S. Appl. No. 17/125,420 dated Oct. 13, 2023, 19 pgs.
Non-Final Office Action from U.S. Appl. No. 18/076,104 dated Dec. 12, 2023, 11 pgs.
Notice of Allowance from U.S. Appl. No. 17/125,420 dated Jan. 10, 2024, 14 pgs.
Notice of Allowance from U.S. Appl. No. 17/681,025 dated Oct. 17, 2023, 14 pgs.
Office Action from Chinese Patent Application No. 201811004538.4 dated Dec. 25, 2023, 11 pgs.
Office Action from Chinese Patent Application No. 201811006541.X dated Dec. 6, 2023, 10 pgs.

\* cited by examiner

CLOUD-BASED SCALE-UP SYSTEM COMPOSITION

CROSS-REFERENCE TO RELATED APPLICATIONS

This patent application is a continuation of U.S. patent application Ser. No. 17/246,388, filed Apr. 30, 2021, which is a continuation of U.S. patent application Ser. No. 16/344,582, filed Apr. 24, 2019, now U.S. Pat. No. 11,016,832, issued on May 25, 2021, which is a national stage entry under 35 USC § 371(b) of International Application No. PCT/US2017/063756, filed Nov. 29, 2017 and claims the benefit of U.S. Provisional Patent Application No. 62/427,268, filed Nov. 29, 2016, Indian Provisional Patent Application No. 201741030632, filed Aug. 30, 2017, and U.S. Provisional Patent Application No. 62/584,401, filed Nov. 10, 2017.

BACKGROUND

In a system that utilizes multiple processors to cooperatively execute a workload, the multiple processors are typically physically located on the same compute device. In such systems, the processors communicate with one another through a shared memory and/or a local bus to cooperatively execute the workload. However, a given workload may utilize only a portion of the available processors on the compute device. As a result, the other processors may be underutilized, leading to wastage of resources. Conversely, the workload may benefit from being executed on a greater number of processors than the set of processors available on a single compute device, such as when multiple tasks within the workload are amenable to concurrent execution. In a data center, such as a cloud data center in which customers agree to pay a predefined amount of money in return for a set of target quality of service metrics (e.g., a target latency, a target throughput, etc.), incorrectly matching the available resources of compute devices to the workloads may result in lost money and/or time, either in the form of purchasing and allocating too many resources (e.g., processors) to a workload or providing too few resources (e.g., processors) to a workload that could be executed more efficiently (e.g., at a higher quality of service) with more processors on the same compute device.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
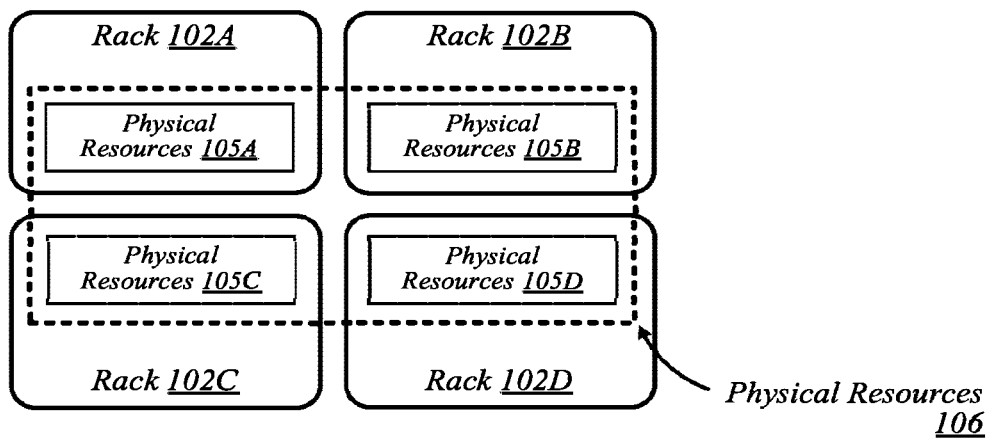
FIG. 1 is a diagram of a conceptual overview of a data center in which one or more techniques described herein may be implemented according to various embodiments.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

FIG. 1 illustrates a conceptual overview of a data center 100 that may generally be representative of a data center or other type of computing network in/for which one or more techniques described herein may be implemented according to various embodiments. As shown in FIG. 1, data center 100 may generally contain a plurality of racks, each of which may house computing equipment comprising a respective set of physical resources. In the particular non-limiting example depicted in FIG. 1, data center 100 contains four racks 102A to 102D, which house computing equipment comprising respective sets of physical resources (PCRs) 105A to 105D. According to this example, a collective set of physical resources 106 of data center 100 includes the various sets of physical resources 105A to 105D that are distributed among racks 102A to 102D. Physical resources 106 may include resources of multiple types, such as—for example—processors, co-processors, accelerators, field programmable gate arrays (FPGAs), memory, and storage. The embodiments are not limited to these examples.

The illustrative data center 100 differs from typical data centers in many ways. For example, in the illustrative embodiment, the circuit boards ("sleds") on which components such as CPUs, memory, and other components are placed are designed for increased thermal performance. In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center 100 may, in use, pool resources, such as memory, accelerators (e.g., graphics accelerators, FPGAs, ASICs, etc.), and data storage drives that are physically disaggregated, and provide them to compute resources (e.g., processors) on an as needed basis, enabling the compute resources to access the pooled resources as if they were local. The illustrative data center 100 additionally receives utilization information for the various resources, predicts resource utilization for different types of workloads based on past resource utilization, and dynamically reallocates the resources based on this information.

The racks 102A, 102B, 102C, 102D of the data center 100 may include physical design features that facilitate the automation of a variety of types of maintenance tasks. For example, data center 100 may be implemented using racks that are designed to be robotically-accessed, and to accept and house robotically-manipulatable resource sleds. Furthermore, in the illustrative embodiment, the racks 102A, 102B, 102C, 102D include integrated power sources that receive a greater voltage than is typical for power sources. The increased voltage enables the power sources to provide additional power to the components on each sled, enabling the components to operate at higher than typical frequencies.

Figure 2:
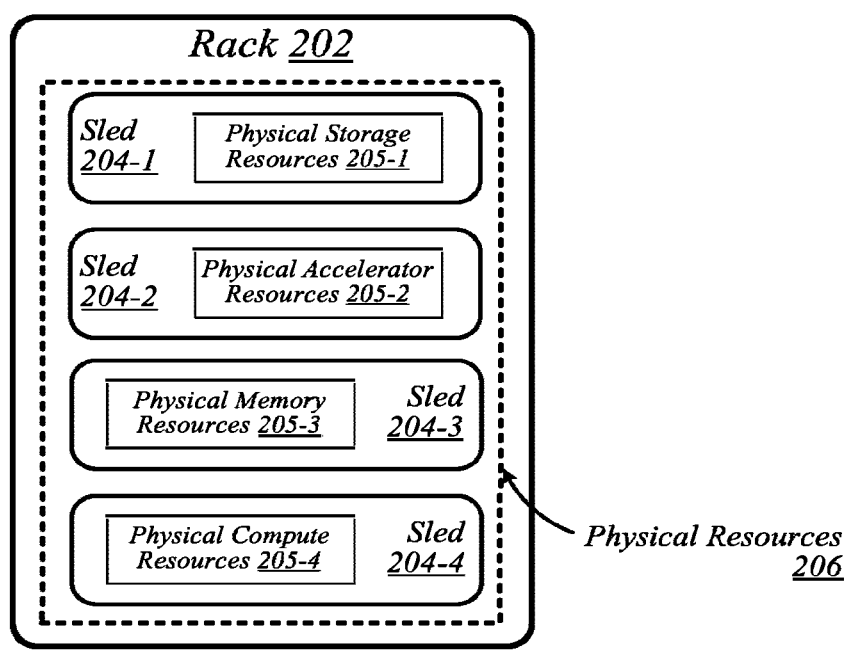
FIG. 2 is a diagram of an example embodiment of a logical configuration of a rack of the data center of FIG. 1.

FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in FIG. 2, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. In the context of this example, physical resources 105A may thus be made up of the respective sets of physical resources, including physical storage resources 205-1, physical accelerator resources 205-2, physical memory resources 205-3, and physical compute resources 205-5 comprised in the sleds 204-1 to 204-4 of rack 202. The embodiments are not limited to this example. Each sled may contain a pool of each of the various types of physical resources (e.g., compute, memory, accelerator, storage). By having robotically accessible and robotically manipulatable sleds comprising disaggregated resources, each type of resource can be upgraded independently of each other and at their own optimized refresh rate.

Figure 3:
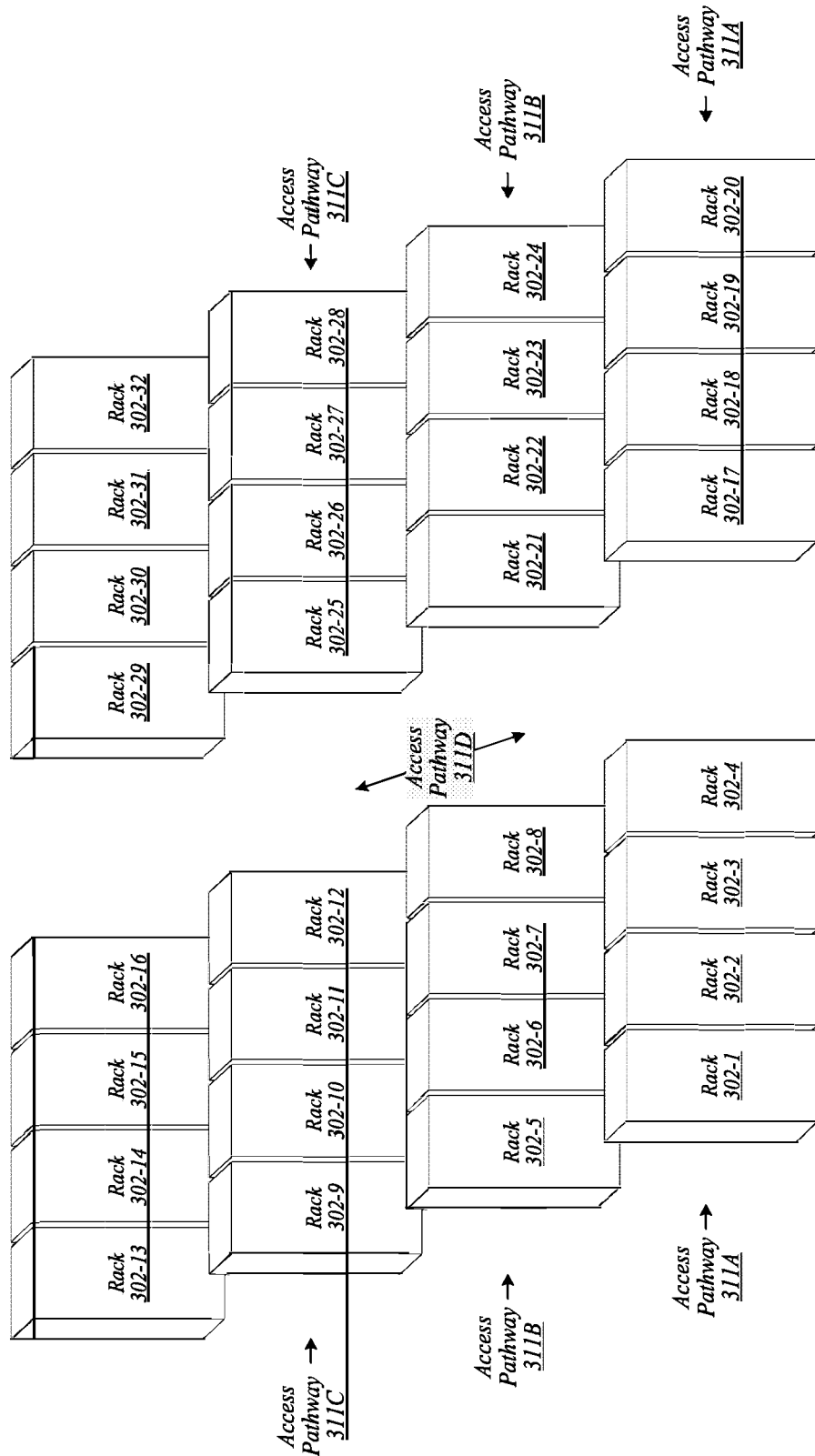
FIG. 3 is a diagram of an example embodiment of another data center in which one or more techniques described herein may be implemented according to various embodiments.

FIG. 3 illustrates an example of a data center 300 that may generally be representative of one in/for which one or more techniques described herein may be implemented according to various embodiments. In the particular non-limiting example depicted in FIG. 3, data center 300 comprises racks 302-1 to 302-32. In various embodiments, the racks of data center 300 may be arranged in such fashion as to define and/or accommodate various access pathways. For example, as shown in FIG. 3, the racks of data center 300 may be arranged in such fashion as to define and/or accommodate access pathways 311A, 311B, 311C, and 311D. In some embodiments, the presence of such access pathways may generally enable automated maintenance equipment, such as robotic maintenance equipment, to physically access the computing equipment housed in the various racks of data center 300 and perform automated maintenance tasks (e.g., replace a failed sled, upgrade a sled). In various embodiments, the dimensions of access pathways 311A, 311B, 311C, and 311D, the dimensions of racks 302-1 to 302-32, and/or one or more other aspects of the physical layout of data center 300 may be selected to facilitate such automated operations. The embodiments are not limited in this context.

Figure 4:
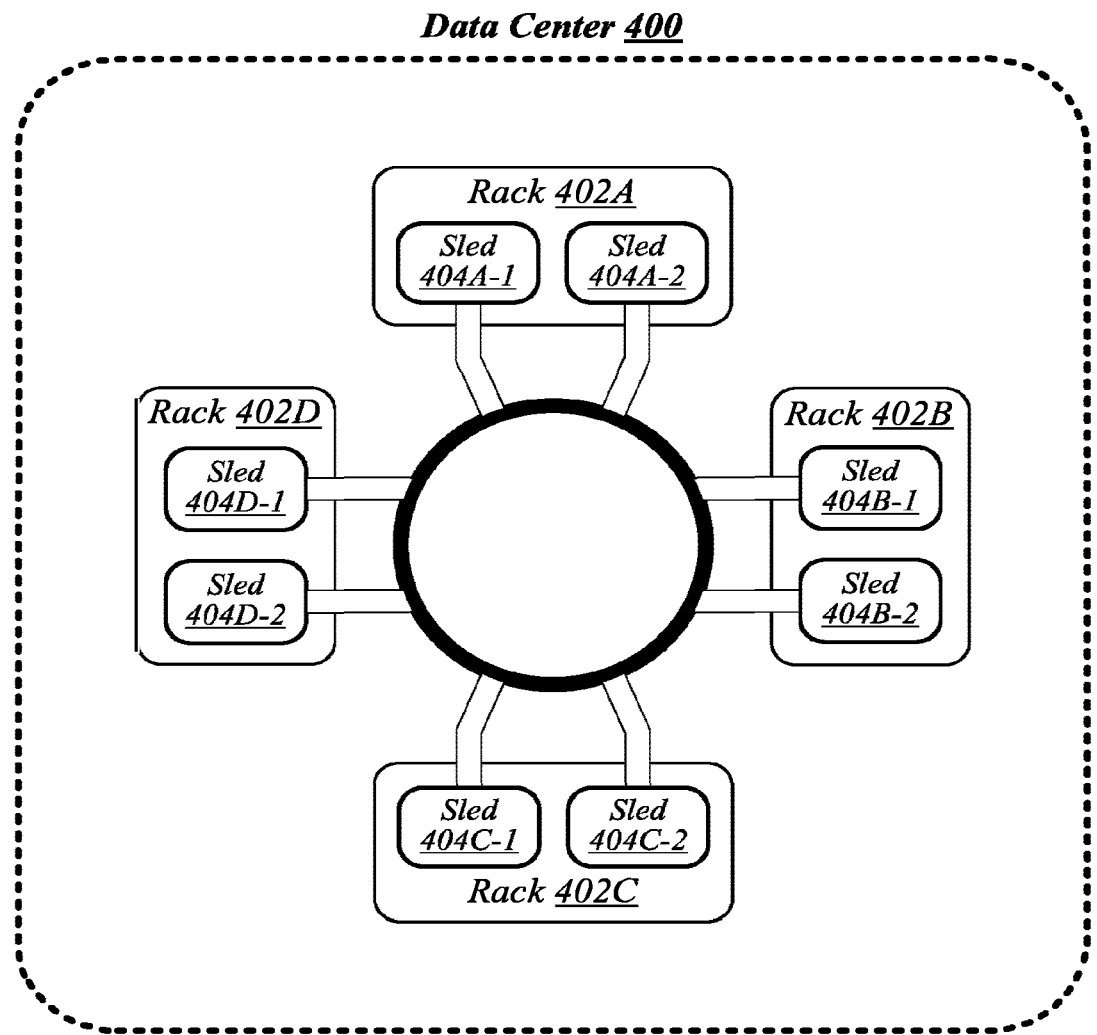
FIG. 4 is a diagram of another example embodiment of a data center in which one or more techniques described herein may be implemented according to various embodiments.

FIG. 4 illustrates an example of a data center 400 that may generally be representative of one in/for which one or more techniques described herein may be implemented according to various embodiments. As shown in FIG. 4, data center 400 may feature an optical fabric 412. Optical fabric 412 may generally comprise a combination of optical signaling media (such as optical cabling) and optical switching infrastructure via which any particular sled in data center 400 can send signals to (and receive signals from) each of the other sleds in data center 400. The signaling connectivity that optical fabric 412 provides to any given sled may include connectivity both to other sleds in a same rack and sleds in other racks. In the particular non-limiting example depicted in FIG. 4, data center 400 includes four racks 402A to 402D. Racks 402A to 402D house respective pairs of sleds 404A-1 and 404A-2, 404B-1 and 404B-2, 404C-1 and 404C-2, and 404D-1 and 404D-2. Thus, in this example, data center 400 comprises a total of eight sleds. Via optical fabric 412, each such sled may possess signaling connectivity with each of the seven other sleds in data center 400. For example, via optical fabric 412, sled 404A-1 in rack 402A may possess signaling connectivity with sled 404A-2 in rack 402A, as well as the six other sleds 404B-1, 404B-2, 404C-1, 404C-2, 404D-1, and 404D-2 that are distributed among the other racks 402B, 402C, and 402D of data center 400. The embodiments are not limited to this example.

Figure 5:
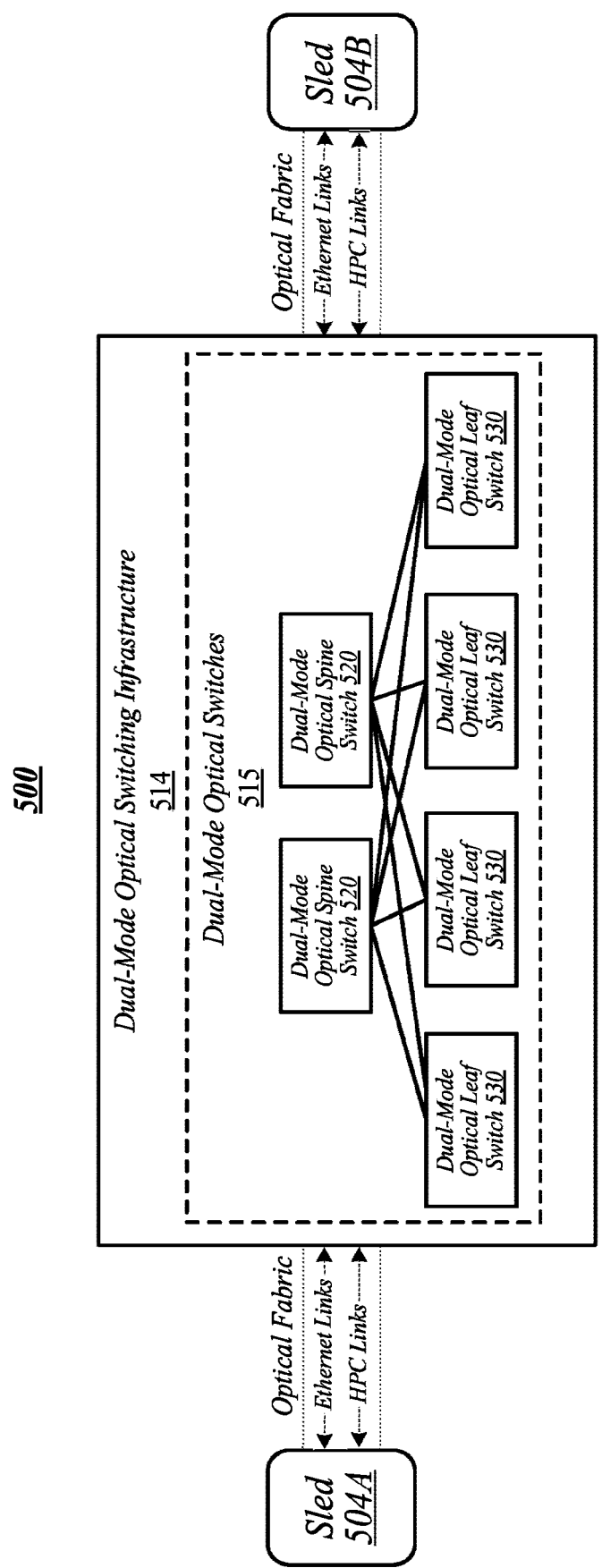
FIG. 5 is a diagram of a connectivity scheme representative of link-layer connectivity that may be established among various sleds of the data centers of FIGS. 1, 3, and 4.

FIG. 5 illustrates an overview of a connectivity scheme 500 that may generally be representative of link-layer connectivity that may be established in some embodiments among the various sleds of a data center, such as any of example data centers 100, 300, and 400 of FIGS. 1, 3, and 4. Connectivity scheme 500 may be implemented using an optical fabric that features a dual-mode optical switching infrastructure 514. Dual-mode optical switching infrastructure 514 may generally comprise a switching infrastructure that is capable of receiving communications according to multiple link-layer protocols via a same unified set of optical signaling media, and properly switching such communications. In various embodiments, dual-mode optical switching infrastructure 514 may be implemented using one or more dual-mode optical switches 515. In various embodiments, dual-mode optical switches 515 may generally comprise high-radix switches. In some embodiments, dual-mode optical switches 515 may comprise multi-ply switches, such as four-ply switches. In various embodiments, dual-mode optical switches 515 may feature integrated silicon photonics that enable them to switch communications with significantly reduced latency in comparison to conventional switching devices. In some embodiments, dual-mode optical switches 515 may constitute leaf switches 530 in a leaf-spine architecture additionally including one or more dual-mode optical spine switches 520.

In various embodiments, dual-mode optical switches may be capable of receiving both Ethernet protocol communications carrying Internet Protocol (IP packets) and communications according to a second, high-performance computing (HPC) link-layer protocol (e.g., Intel's Omni-Path Architecture's, Infiniband) via optical signaling media of an optical fabric. As reflected in FIG. 5, with respect to any particular pair of sleds 504A and 504B possessing optical signaling connectivity to the optical fabric, connectivity scheme 500 may thus provide support for link-layer connectivity via both Ethernet links and HPC links. Thus, both Ethernet and HPC communications can be supported by a single high-bandwidth, low-latency switch fabric. The embodiments are not limited to this example.

Figure 6:
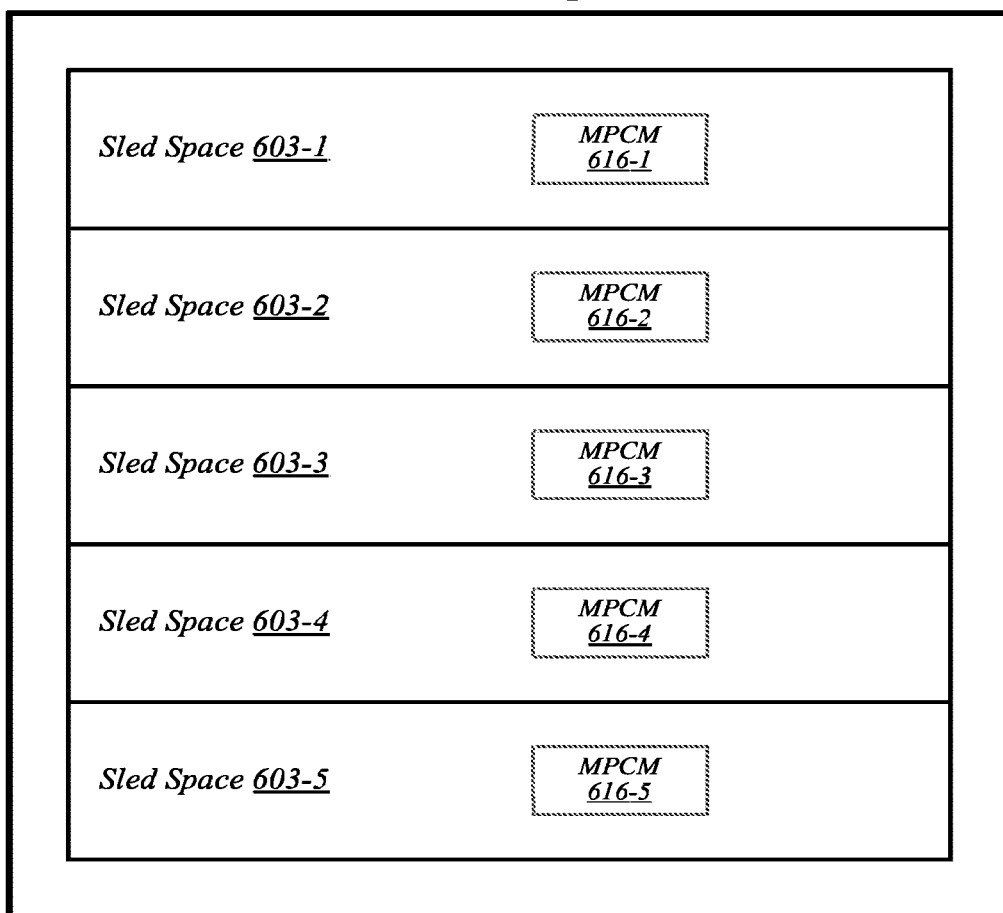
FIG. 6 is a diagram of a rack architecture that may be representative of an architecture of any particular one of the racks depicted in FIGS. 1-4 according to some embodiments.

FIG. 6 illustrates a general overview of a rack architecture 600 that may be representative of an architecture of any particular one of the racks depicted in FIGS. 1 to 4 according to some embodiments. As reflected in FIG. 6, rack architecture 600 may generally feature a plurality of sled spaces into which sleds may be inserted, each of which may be robotically-accessible via a rack access region 601. In the particular non-limiting example depicted in FIG. 6, rack architecture 600 features five sled spaces 603-1 to 603-5. Sled spaces 603-1 to 603-5 feature respective multi-purpose connector modules (MPCMs) 616-1 to 616-5.

Figure 7:
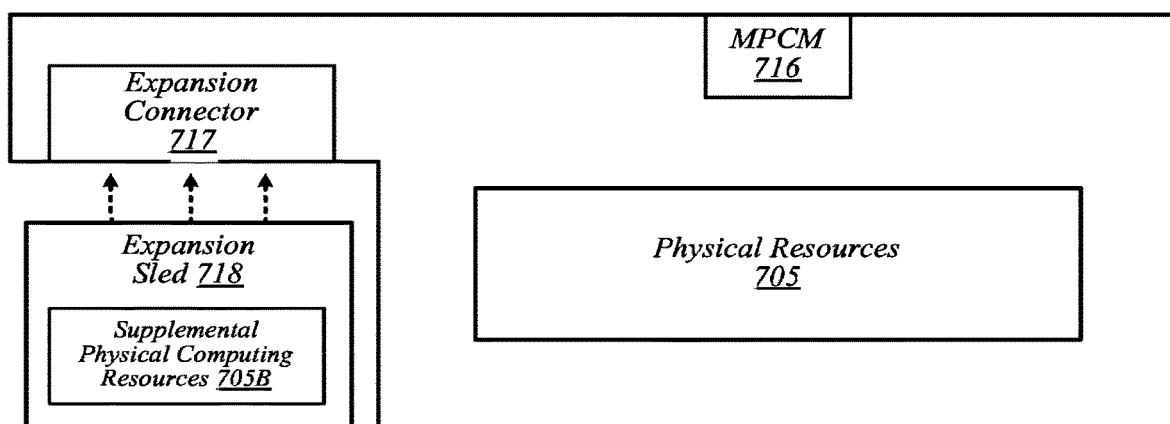
FIG. 7 is a diagram of an example embodiment of a sled that may be used with the rack architecture of FIG. 6.

FIG. 7 illustrates an example of a sled 704 that may be representative of a sled of such a type. As shown in FIG. 7, sled 704 may comprise a set of physical resources 705, as well as an MPCM 716 designed to couple with a counterpart MPCM when sled 704 is inserted into a sled space such as any of sled spaces 603-1 to 603-5 of FIG. 6. Sled 704 may also feature an expansion connector 717. Expansion connector 717 may generally comprise a socket, slot, or other type of connection element that is capable of accepting one or more types of expansion modules, such as an expansion sled 718. By coupling with a counterpart connector on expansion sled 718, expansion connector 717 may provide physical resources 705 with access to supplemental computing resources 705B residing on expansion sled 718. The embodiments are not limited in this context.

Figure 8:
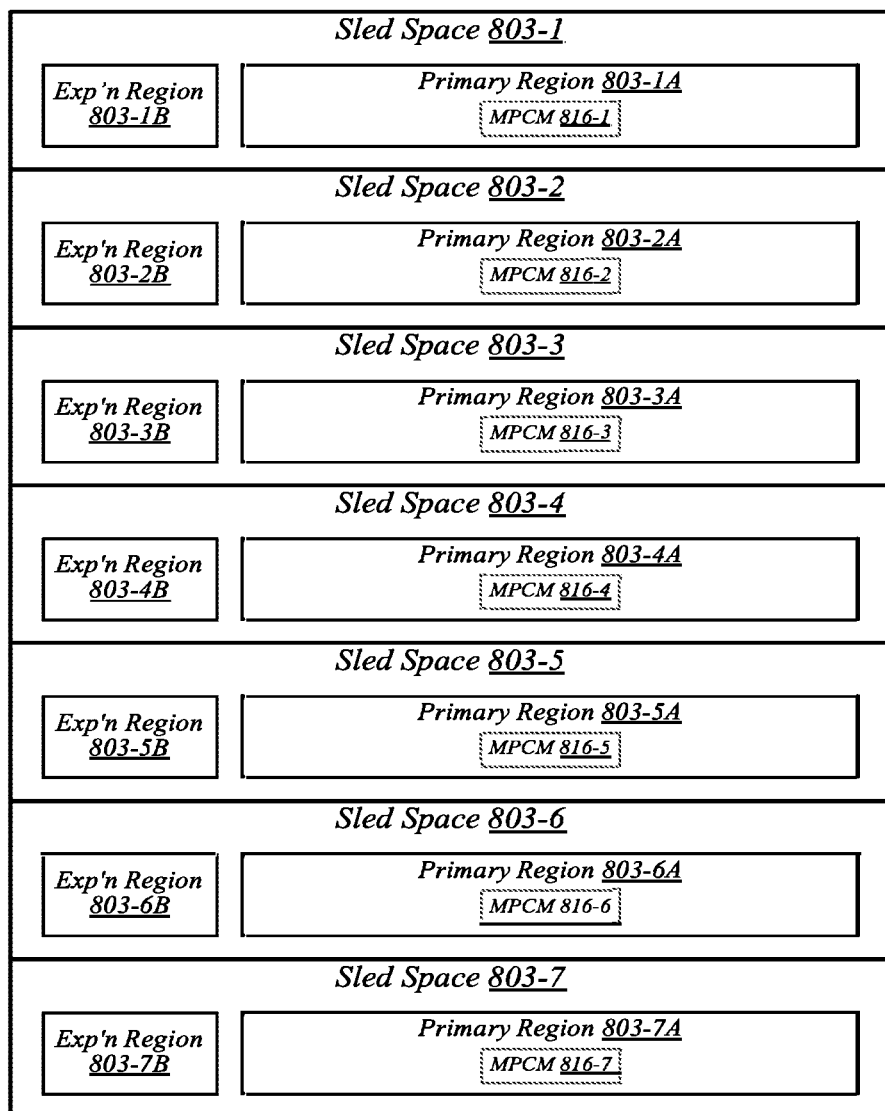
FIG. 8 is a diagram of an example embodiment of a rack architecture to provide support for sleds featuring expansion capabilities.

FIG. 8 illustrates an example of a rack architecture 800 that may be representative of a rack architecture that may be implemented in order to provide support for sleds featuring expansion capabilities, such as sled 704 of FIG. 7. In the particular non-limiting example depicted in FIG. 8, rack architecture 800 includes seven sled spaces 803-1 to 803-7, which feature respective MPCMs 816-1 to 816-7. Sled spaces 803-1 to 803-7 include respective primary regions 803-1A to 803-7A and respective expansion regions 803-1B to 803-7B. With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 718 of FIG. 7, in the event that the inserted sled is configured with such a module.

Figure 9:
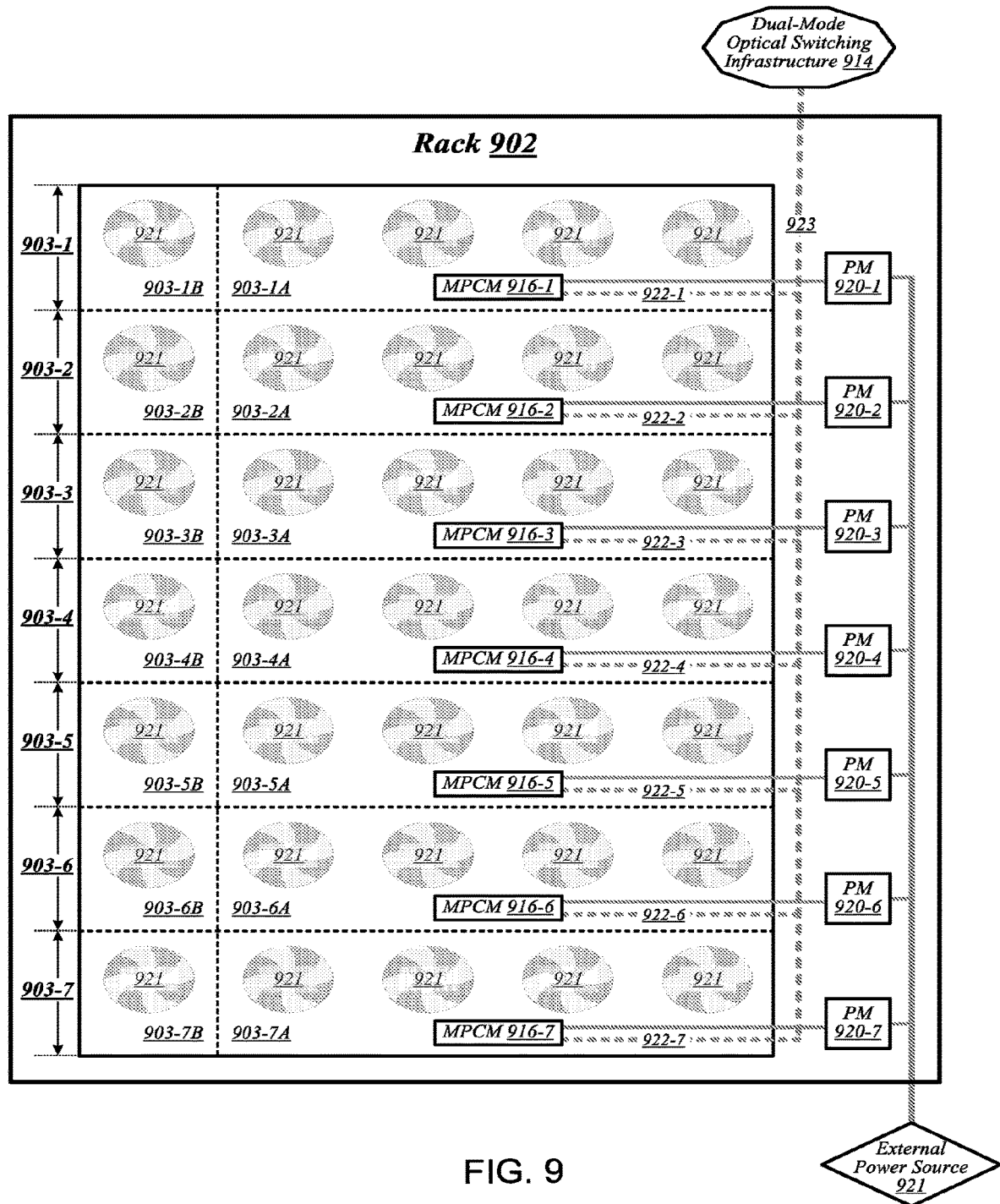
FIG. 9 is a diagram of an example embodiment of a rack implemented according to the rack architecture of FIG. 8.

FIG. 9 illustrates an example of a rack 902 that may be representative of a rack implemented according to rack architecture 800 of FIG. 8 according to some embodiments. In the particular non-limiting example depicted in FIG. 9, rack 902 features seven sled spaces 903-1 to 903-7, which include respective primary regions 903-1A to 903-7A and respective expansion regions 903-1B to 903-7B. In various embodiments, temperature control in rack 902 may be implemented using an air cooling system. For example, as reflected in FIG. 9, rack 902 may feature a plurality of fans 919 that are generally arranged to provide air cooling within the various sled spaces 903-1 to 903-7. In some embodiments, the height of the sled space is greater than the conventional "1U" server height. In such embodiments, fans 919 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W) due to improved cooling (i.e., no thermal shadowing, more space between devices, more room for larger heat sinks, etc.).

MPCMs 916-1 to 916-7 may be configured to provide inserted sleds with access to power sourced by respective power modules 920-1 to 920-7, each of which may draw power from an external power source 921. In various embodiments, external power source 921 may deliver alternating current (AC) power to rack 902, and power modules 920-1 to 920-7 may be configured to convert such AC power to direct current (DC) power to be sourced to inserted sleds. In some embodiments, for example, power modules 920-1 to 920-7 may be configured to convert 277-volt AC power into 12-volt DC power for provision to inserted sleds via respective MPCMs 916-1 to 916-7. The embodiments are not limited to this example.

MPCMs 916-1 to 916-7 may also be arranged to provide inserted sleds with optical signaling connectivity to a dual-mode optical switching infrastructure 914, which may be the same as—or similar to—dual-mode optical switching infrastructure 514 of FIG. 5. In various embodiments, optical connectors contained in MPCMs 916-1 to 916-7 may be designed to couple with counterpart optical connectors contained in MPCMs of inserted sleds to provide such sleds with optical signaling connectivity to dual-mode optical switching infrastructure 914 via respective lengths of optical cabling 922-1 to 922-7. In some embodiments, each such length of optical cabling may extend from its corresponding MPCM to an optical interconnect loom 923 that is external to the sled spaces of rack 902. In various embodiments, optical interconnect loom 923 may be arranged to pass through a support post or other type of load-bearing element of rack 902. The embodiments are not limited in this context. Because inserted sleds connect to an optical switching infrastructure via MPCMs, the resources typically spent in manually configuring the rack cabling to accommodate a newly inserted sled can be saved.

Figure 10:
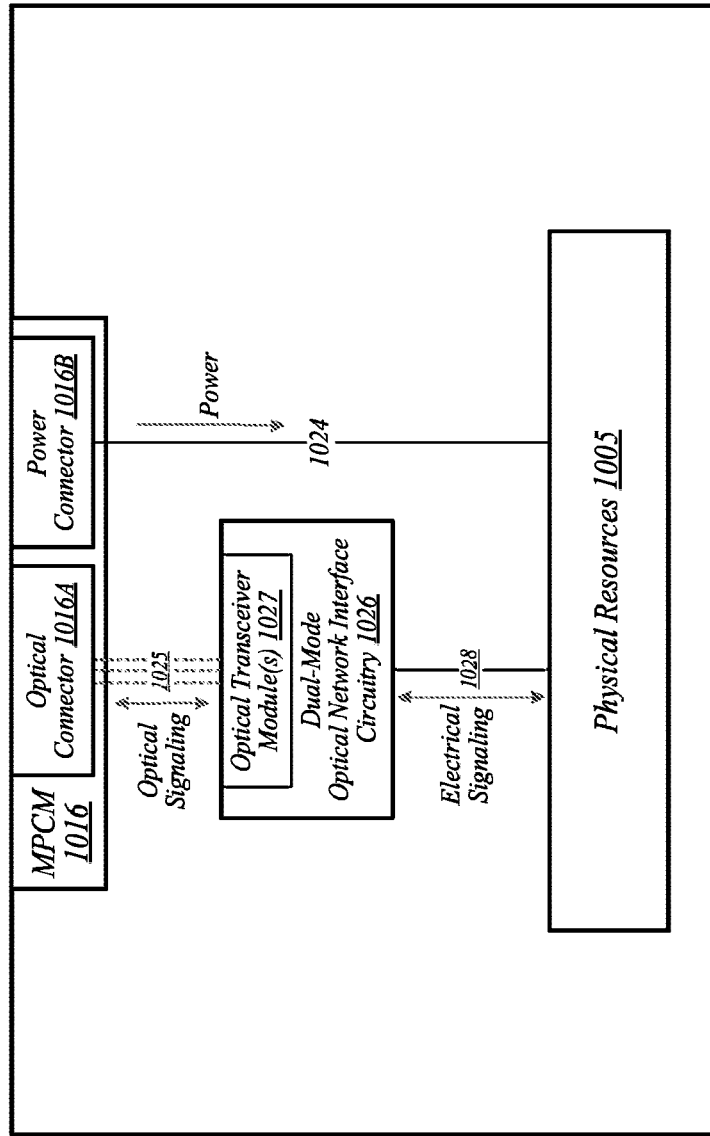
FIG. 10 is a diagram of an example embodiment of a sled designed for use in conjunction with the rack of FIG. 9.

FIG. 10 illustrates an example of a sled 1004 that may be representative of a sled designed for use in conjunction with rack 902 of FIG. 9 according to some embodiments. Sled 1004 may feature an MPCM 1016 that comprises an optical connector 1016A and a power connector 1016B, and that is designed to couple with a counterpart MPCM of a sled space in conjunction with insertion of MPCM 1016 into that sled space. Coupling MPCM 1016 with such a counterpart MPCM may cause power connector 1016 to couple with a power connector comprised in the counterpart MPCM. This may generally enable physical resources 1005 of sled 1004 to source power from an external source, via power connector 1016 and power transmission media 1024 that conductively couples power connector 1016 to physical resources 1005.

Sled 1004 may also include dual-mode optical network interface circuitry 1026. Dual-mode optical network interface circuitry 1026 may generally comprise circuitry that is capable of communicating over optical signaling media according to each of multiple link-layer protocols supported by dual-mode optical switching infrastructure 914 of FIG. 9. In some embodiments, dual-mode optical network interface circuitry 1026 may be capable both of Ethernet protocol communications and of communications according to a second, high-performance protocol. In various embodiments, dual-mode optical network interface circuitry 1026 may include one or more optical transceiver modules 1027, each of which may be capable of transmitting and receiving optical signals over each of one or more optical channels. The embodiments are not limited in this context.

Coupling MPCM 1016 with a counterpart MPCM of a sled space in a given rack may cause optical connector 1016A to couple with an optical connector comprised in the counterpart MPCM. This may generally establish optical connectivity between optical cabling of the sled and dual-mode optical network interface circuitry 1026, via each of a set of optical channels 1025. Dual-mode optical network interface circuitry 1026 may communicate with the physical resources 1005 of sled 1004 via electrical signaling media 1028. In addition to the dimensions of the sleds and arrangement of components on the sleds to provide improved cooling and enable operation at a relatively higher thermal envelope (e.g., 250 W), as described above with reference to FIG. 9, in some embodiments, a sled may include one or more additional features to facilitate air cooling, such as a heatpipe and/or heat sinks arranged to dissipate heat generated by physical resources 1005. It is worthy of note that although the example sled 1004 depicted in FIG. 10 does not feature an expansion connector, any given sled that features the design elements of sled 1004 may also feature an expansion connector according to some embodiments. The embodiments are not limited in this context.

Figure 11:
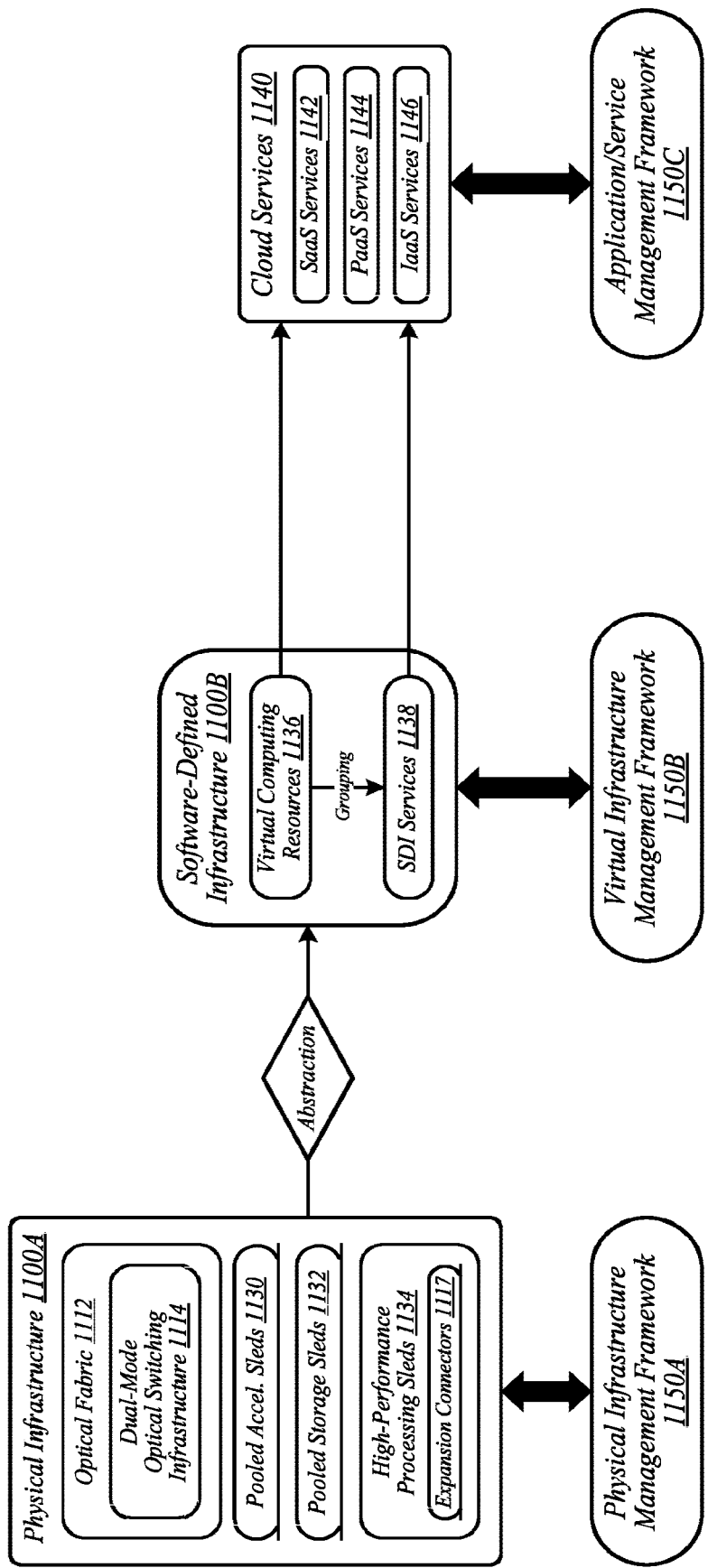
FIG. 11 is a diagram of an example embodiment of a data center in which one or more techniques described herein may be implemented according to various embodiments.

FIG. 11 illustrates an example of a data center 1100 that may generally be representative of one in/for which one or more techniques described herein may be implemented according to various embodiments. As reflected in FIG. 11, a physical infrastructure management framework 1150A may be implemented to facilitate management of a physical infrastructure 1100A of data center 1100. In various embodiments, one function of physical infrastructure management framework 1150A may be to manage automated maintenance functions within data center 1100, such as the use of robotic maintenance equipment to service computing equipment within physical infrastructure 1100A. In some embodiments, physical infrastructure 1100A may feature an advanced telemetry system that performs telemetry reporting that is sufficiently robust to support remote automated management of physical infrastructure 1100A. In various embodiments, telemetry information provided by such an advanced telemetry system may support features such as failure prediction/prevention capabilities and capacity planning capabilities. In some embodiments, physical infrastructure management framework 1150A may also be configured to manage authentication of physical infrastructure components using hardware attestation techniques. For example, robots may verify the authenticity of components before installation by analyzing information collected from a radio frequency identification (RFID) tag associated with each component to be installed. The embodiments are not limited in this context.

As shown in FIG. 11, the physical infrastructure 1100A of data center 1100 may comprise an optical fabric 1112, which may include a dual-mode optical switching infrastructure 1114. Optical fabric 1112 and dual-mode optical switching infrastructure 1114 may be the same as—or similar to—optical fabric 412 of FIG. 4 and dual-mode optical switching infrastructure 514 of FIG. 5, respectively, and may provide high-bandwidth, low-latency, multi-protocol connectivity among sleds of data center 1100. As discussed above, with reference to FIG. 1, in various embodiments, the availability of such connectivity may make it feasible to disaggregate and dynamically pool resources such as accelerators, memory, and storage. In some embodiments, for example, one or more pooled accelerator sleds 1130 may be included among the physical infrastructure 1100A of data center 1100, each of which may comprise a pool of accelerator resources—such as co-processors and/or FPGAs, for example—that is globally accessible to other sleds via optical fabric 1112 and dual-mode optical switching infrastructure 1114.

In another example, in various embodiments, one or more pooled storage sleds 1132 may be included among the physical infrastructure 1100A of data center 1100, each of which may comprise a pool of storage resources that is globally accessible to other sleds via optical fabric 1112 and dual-mode optical switching infrastructure 1114. In some embodiments, such pooled storage sleds 1132 may comprise pools of solid-state storage devices such as solid-state drives (SSDs). In various embodiments, one or more high-performance processing sleds 1134 may be included among the physical infrastructure 1100A of data center 1100. In some embodiments, high-performance processing sleds 1134 may comprise pools of high-performance processors, as well as cooling features that enhance air cooling to yield a higher thermal envelope of up to 250 W or more. In various embodiments, any given high-performance processing sled 1134 may feature an expansion connector 1117 that can accept a far memory expansion sled, such that the far memory that is locally available to that high-performance processing sled 1134 is disaggregated from the processors and near memory comprised on that sled. In some embodiments, such a high-performance processing sled 1134 may be configured with far memory using an expansion sled that comprises low-latency SSD storage. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 5. The embodiments are not limited in this context.

In various embodiments, one or more layers of abstraction may be applied to the physical resources of physical infrastructure 1100A in order to define a virtual infrastructure, such as a software-defined infrastructure 1100B. In some embodiments, virtual computing resources 1136 of software-defined infrastructure 1100B may be allocated to support the provision of cloud services 1140. In various embodiments, particular sets of virtual computing resources 1136 may be grouped for provision to cloud services 1140 in the form of SDI services 1138. Examples of cloud services 1140 may include—without limitation—software as a service (SaaS) services 1142, platform as a service (PaaS) services 1144, and infrastructure as a service (IaaS) services 1146.

In some embodiments, management of software-defined infrastructure 1100B may be conducted using a virtual infrastructure management framework 1150B. In various embodiments, virtual infrastructure management framework 1150B may be designed to implement workload fingerprinting techniques and/or machine-learning techniques in conjunction with managing allocation of virtual computing resources 1136 and/or SDI services 1138 to cloud services 1140. In some embodiments, virtual infrastructure management framework 1150B may use/consult telemetry data in conjunction with performing such resource allocation. In various embodiments, an application/service management framework 1150C may be implemented in order to provide QoS management capabilities for cloud services 1140. The embodiments are not limited in this context.

Figure 12:
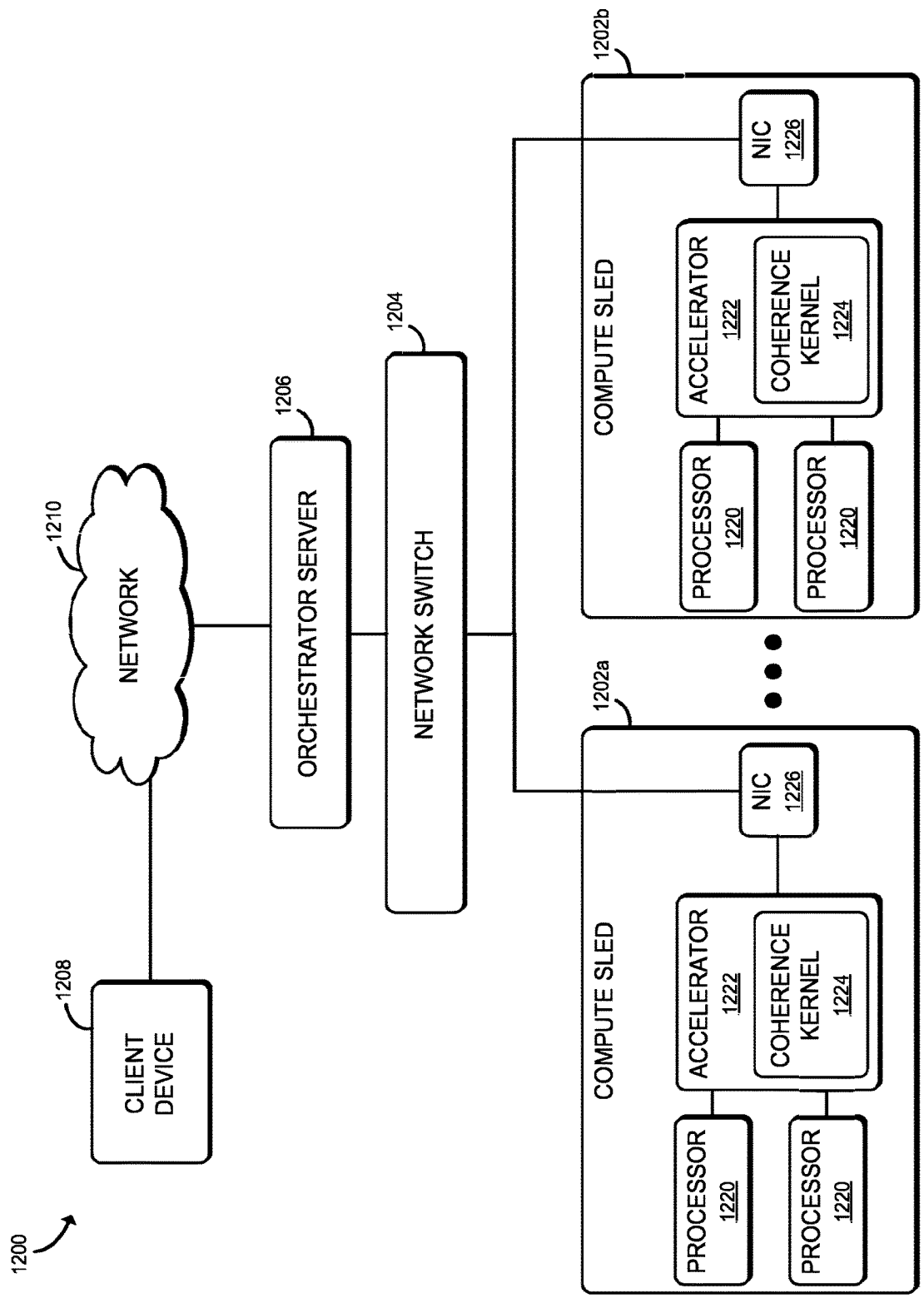
FIG. 12 is a simplified block diagram of at least one embodiment of a system for composing a managed node with multiple processors on multiple compute sleds to cooperatively execute a workload.

Referring now to FIG. 12, a system 1200, which may be implemented in accordance with the data centers 100, 300, 400, 1100 described above with reference to FIGS. 1, 3, 4, and 11, for composing a managed node with multiple processors from multiple compute sleds 1202 to cooperatively execute a workload includes an orchestrator server 1206 in communication with compute sleds 1202 (e.g., physical compute resources 205-4) from the same or different racks (e.g., one or more of racks 302-1 through 302-32) via a network switch 1204. In use, the system 1200 is configured to compose a managed node with multiple processors 1220 on multiple compute sleds 1202 to cooperatively execute a workload as if the processors 1220 of the managed node were local to the same compute sled 1202. To do so, an accelerator 1222 of each compute sled 1202 may receive a request from the orchestrator server 1206 that indicates a number of processors 1220 of the corresponding compute sled 1202 that is requested to compose a managed node. The request may also indicate the type of workload to be executed. In response, each accelerator 1222 may determine an amount of bandwidth to be used by the accelerator 1222 to communicate coherence data, which may be embodied as updates (e.g., modifications) produced by processors of the present compute sled and/or other compute sleds in the managed node to a set of working data associated with the workload, as the workload is cooperatively executed (e.g., to ensure that each processor of each compute sled included in the managed node has an up-to-date version of the working data). By using the accelerator 1222 in combination with the network switch 1204 for controlling the communication between the compute sleds 1202, the system 1200 may dynamically compose a managed node with any number of processors 1220 for the concurrent execution of the workload, as if the processors were local to each other (e.g., on the same compute sled), regardless of how many processor are actually located on a given compute sled.

While two compute sleds 1202 are shown in FIG. 12, it should be appreciated that the system 1200 may include any number of compute sleds 1202 to compose a managed node. The system 1200 may be located in a data center and provide storage and compute services (e.g., cloud services) to a client device 1208 that is in communication with the system 1200 through a network 1210. The orchestrator server 1206 may support a cloud operating environment, such as OpenStack, and the compute sleds 1202 may execute one or more applications or processes (i.e., workloads), such as in virtual machines or containers.

As shown in FIG. 12, the client device 1208, the orchestrator server 1206, the network switch 1204, and the compute sleds 1202 are illustratively in communication via the network 1210, which may be embodied as any type of wired or wireless communication network, including global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), or any combination thereof.

In the illustrative embodiment, each compute sled 1202 includes two processors 1220, the accelerator 1222, and a network interface controller (NIC) 1226 that is configured to communicate with the network switch 1204. It should be appreciated that, in other embodiments, each compute sled 1202 may include a different number of processors 1220 and accelerator 1222. In the illustrative embodiment, the accelerator 1222 of the compute sled 1202 includes a coherence kernel (e.g., a set of circuitry and/or executable code usable to implement a set of functions) 1224 that is configured to enable the accelerator 1222 to perform node coherence functions to communicate coherence data with other accelerator(s) of other compute sled(s) 1202 via the network switch 1204.

The network switch 1204 is configured to communicatively connect the processors 1220 and/or the accelerator 1222 of the compute sleds 1202 included in the managed node to share coherence data. For example, the processors 1220 on different compute sleds 1202 of the managed node may cooperatively execute tasks that share a data set of the workload and may later access the same data set in order to read from and/or write to different parts of the data set. To ensure that the processors 1220 of the managed node are executing the workload using the most recently updated data associated with the workload, the network switch 1204 may receive coherence data (i.e., data indicative of updates to the data set by the processor(s) 1220 of one compute sled 1202*a*) from the coherence kernel 1224 of the accelerator 1222 of the corresponding compute sled 1202*a* via the network interface controller 1226 of the corresponding compute sled 1202. The network switch 1204 may subsequently transmit the coherence data to other processor(s) 1220 of the other compute sled 1202*b* that is included in the managed node to update the local working data used by the compute sled 1202*b*.

Figure 13:
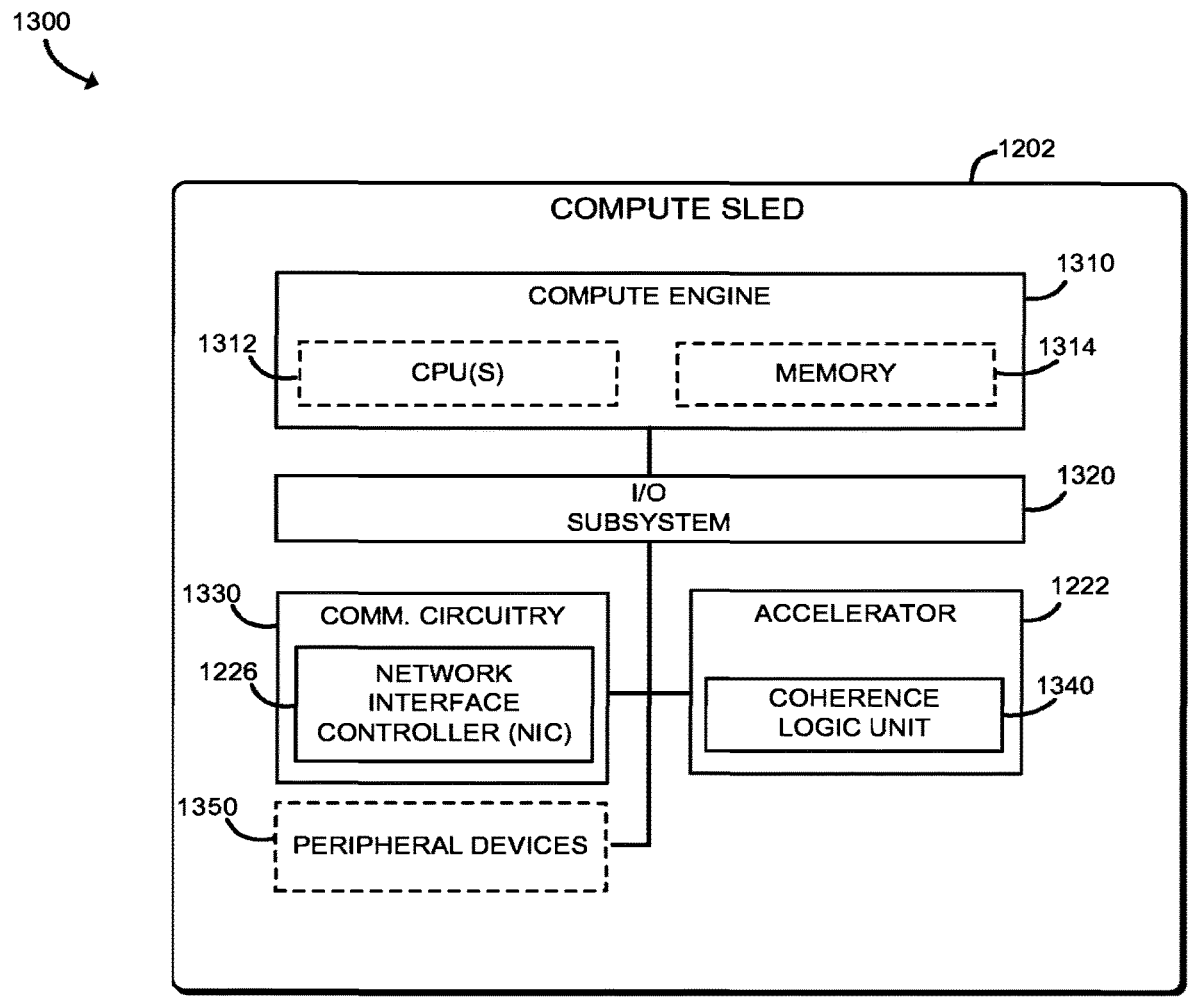
FIG. 13 is a simplified block diagram of a orchestrator server of FIG. 12.

Referring now to FIG. 13, each compute sled 1202 may be embodied as any type of compute device capable of performing the functions described herein. For example, the compute sled 1202 may be embodied as a sled 204-4 with physical compute resources 205-4, a computer, a server, a multiprocessor system, a network appliance (e.g., physical or virtual), a desktop computer, a workstation, a laptop computer, a notebook computer, a processor-based system, or a network appliance. As shown in FIG. 13, the illustrative compute sled 1202 includes a compute engine 1310, an input/output ("I/O") subsystem 1320, communication circuitry 1330, and an accelerator 1222 that includes a coherence logic unit 1340, which may also be referred to as coherence logic unit circuitry. It should be appreciated that the compute sled 1202 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component.

The compute engine 1310 may be embodied as any type of device or collection of devices capable of performing the various compute functions as described below. In some embodiments, the compute engine 1310 may be embodied as a single device such as an integrated circuit, an embedded system, a field-programmable-array (FPGA), a system-on-a-chip (SOC), an application specific integrated circuit (ASIC), reconfigurable hardware or hardware circuitry, or other specialized hardware to facilitate performance of the functions described herein. Additionally, in some embodiments, the compute engine 1310 may include, or may be embodied as, a CPU 1312 and memory 1314. The CPU 1312 may be embodied as any type of processor capable of performing the functions described herein. For example, the CPU 1312 may be embodied as a single or multi-core processor(s), digital signal processor, microcontroller, or other processor or processing/controlling circuit.

The memory 1314 may be embodied as any type of volatile (e.g., dynamic random access memory (DRAM), etc.) or non-volatile memory or data storage capable of performing the functions described herein. It should be appreciated that the memory 1314 may include multiple physical memory devices. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include future generation nonvolatile devices, such as a three dimensional crosspoint memory device (e.g., Intel 3D XPoint™ memory), or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, all or a portion of the memory 1314 may be integrated into the CPU 1312. In operation, the memory 1314 may store various data and software used during operation of the compute sled 1202 such as operating systems, applications, programs, libraries, and drivers.

The compute engine 1310 is communicatively coupled to other components of the compute sled 1202 via the I/O subsystem 1320, which may be embodied as circuitry and/or components to facilitate input/output operations with the CPU 1312, the memory 1314, and other components of the compute sled 1202. For example, the I/O subsystem 1320 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 1320 may form a portion of a system-on-a-chip (SoC) and be incorporated, along with one or more of the CPU 1312, the memory 1314, and other components of the compute sled 1202, on a single integrated circuit chip.

The communication circuitry 1330 may be embodied as any communication circuit, device, or collection thereof, capable of enabling communications between the compute sled 1202 and another compute device (e.g., the orchestrator server 1206, the network switch 1204, and/or the client device 1208 over the network 1212). The communication circuitry 1330 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 1330 may include a network interface controller (NIC) 1226, which may also be referred to as a host fabric interface (HFI). The NIC 1226 may be embodied as one or more add-in-boards, daughtercards, network interface cards, controller chips, chipsets, or other devices that may be used by the compute sled 1202 to connect with another compute device (e.g., the orchestrator server 1206, another compute sled 1202, the network switch 1204, and/or the client device 1208) via the network switch 1204. In some embodiments, the NIC 1226 may be embodied as part of a system-on-a-chip (SoC) that includes one or more processors, or included on a multichip package that also contains one or more processors. In some embodiments, the NIC 1226 may include a local processor (not shown) and/or a local memory (not shown) that are both local to the NIC 1226. In such embodiments, the local processor of the NIC 1226 may be capable of performing one or more of the functions of the CPU 1312 described herein. Additionally or alternatively, in such embodiments, the local memory of the NIC 1226 may be integrated into one or more components of the compute sled 1202 at the board level, socket level, chip level, and/or other levels. Additionally or alternatively, the compute sled 1202 may include one or more peripheral devices 1350. Such peripheral devices 1350 may include any type of peripheral device commonly found in a compute device such as a display, speakers, a mouse, a keyboard, and/or other input/output devices, interface devices, and/or other peripheral devices.

The accelerator 1222 may be embodied as a single device such as an integrated circuit, an embedded system, a field-programmable-array (FPGA), a system-on-a-chip (SOC), an application specific integrated circuit (ASIC), reconfigurable hardware or hardware circuitry, or other specialized hardware capable of communicating with other accelerator(s) 1222 on other compute sled(s) 1202 of the managed node to cooperatively execute the workload. To do so, the accelerator 1222 further includes the coherence logic unit 1340, which may be embodied as circuitry, components, a kernel (e.g., a set of configured gates in an FPGA), or any type of devices capable of coordinating inter-processor communications to enable the processors 1220 of the managed node to share coherence data across multiple sleds 1202. For example, the coherence logic unit 1340 may configure the accelerator 1222 to perform node coherence functions to coordinate inter-processor communications between the selected processors 1220 of multiple compute sleds 1202 included in the managed node by enabling the selected processors 1220 across the multiple compute sleds 1202 to cooperatively execute a workload (e.g., an application). In the illustrative embodiment, the coherence logic unit 1340 of the corresponding compute sled 1202 may receive a node configuration request from the orchestrator server 1206. The node configuration request illustratively includes information about a managed node to be composed. For example, the node configuration request may include a number of processors 1220 of the corresponding compute sled 1202 required to compose the managed node and/or identifier(s) (IDs) of other compute sled(s) of the managed node that the processor(s) 1220 of the corresponding compute sled 1202 is configured to cooperatively execute workload with. The request may also include an indication of the type of workload (e.g., a code or description indicative of a general class of algorithms to be performed, such as cryptographic operations, transcoding operations, compression/decompression operations, convolutional neural network operations, etc.) to be executed by the managed node.

Upon receiving a node configuration request from the orchestrator server 1206, the accelerator 1222 may be configured to enable one or more processors 1220 of the corresponding compute sled 1202 to perform the node coherence functions to coordinate inter-processor communications between the compute sleds 1202 to enable processors 1220 across multiple compute sleds 1202 to operate cooperatively as if they were local to the same compute sled 1202. For example, the node coherence functions include determining whether the accelerator device 1222 is capable of communicating with another accelerator 1222 of another compute sled 1202, and if so, determining an amount of bandwidth required for accelerator 1222 to communicate coherence data to another accelerator 1222 of another compute sled 1202. The node coherence functions may further include determining coherence data to be communicated to the processor(s) 1220 of other compute sled(s) 1202 of the managed node. As discussed above, the coherence data includes any modifications or updates to the workload resulted from the execution of operations on the local working data on the corresponding compute sled 1202. The accelerator 1222 may determine the coherence data that has been modified by the processor(s) 1220 of the corresponding compute sled 1202. For example, the accelerator 1222 may track the timing (e.g., timestamps), locations (e.g., byte positions), and content of writes to the working data set and communicate information indicative of the writes as the coherence data to the other processor(s) 1220 of other compute sled(s) 1202 of the managed node via the network switch 1204 to update the local working data on the other compute sled(s) 1202 (e.g., to ensure that all processors 1220 of the managed node are working on the most recently updated data to maintain the integrity of working data).

Figure 14:
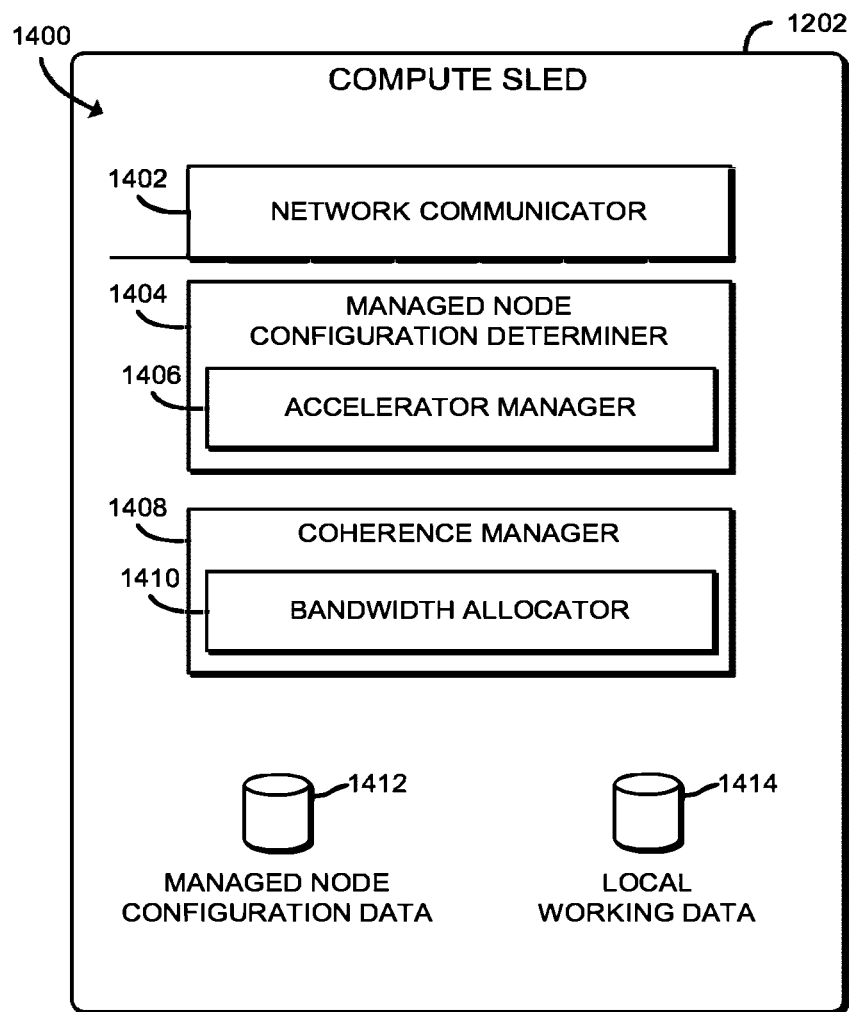
FIG. 14 is a simplified block diagram of at least one embodiment of an environment that may be established by a compute sled of FIGS. 12 and 13.

Referring now to FIG. 14, in the illustrative embodiment, the compute sled 1202 may establish an environment 1400 during operation. In the illustrative embodiment, the environment 1400 includes managed node configuration data 1412, which may be embodied as any data indicative of a configuration of a requested managed node, and local working data 1414, which may be embodied as any data utilized by the workload as it is being executed. The managed node configuration data 1412 and the local working data 1414 may be stored in the memory 1314 of the compute sled 1202. Additionally, the illustrative environment 1400 includes a network communicator 1402, a managed node configuration determiner 1404, and a coherence manager 1408. As shown in FIG. 14, the managed node configuration determiner 1404 further includes an accelerator manager 1406, and the coherence manager 1408 further includes a bandwidth allocator 1410. Each of the components of the environment 1400 may be embodied as hardware, firmware, software, or a combination thereof. As such, in some embodiments, one or more of the components of the environment 1400 may be embodied as circuitry or a collection of electrical devices (e.g., network communicator circuitry 1402, managed node configuration determiner circuitry 1404, accelerator manager circuitry 1406, coherence manager circuitry 1408, bandwidth allocator circuitry 1410, etc.). It should be appreciated that, in such embodiments, one or more of the network communicator circuitry 1402, the managed node configuration determiner circuitry 1404, the accelerator manager circuitry 1406, the coherence manager circuitry 1408, and/or the bandwidth allocator circuitry 1410 may form a portion of one or more of the CPU 1312, the memory 1314, the I/O subsystem 1320, the coherence logic unit 1340, and/or other components of the compute sled 1202.

In the illustrative environment 1400, the network communicator 1402, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from the compute sled 1202, respectively. To do so, the network communicator 1402 is configured to receive and process data from one system or computing device (e.g., the orchestrator server 1206, the network switch 1204, other compute sled(s) 1202, etc.) and to prepare and send data to a system or computing device (e.g., the orchestrator server 1206, the network switch 1204, other compute sled(s) 1202, etc.). Accordingly, in some embodiments, at least a portion of the functionality of the network communicator 1402 may be performed by the communication circuitry 1330, and, in the illustrative embodiment, by the NIC 1226.

The managed node configuration determiner 1404, which may be embodied as hardware, firmware, software, virtualized hardware, emulated architecture, and/or a combination thereof as discussed above, is configured to determine requested configurations of a managed node to be composed and configure the accelerator 1222 of the corresponding compute sled 1202 in accordance of the requested configuration of the managed node. In the illustrative embodiment, the managed node configuration determiner 1404 may be configured to receive a node configuration request from the orchestrator server 1206 that includes managed node configuration data of a managed node to be composed. For example, the managed node configuration data may include a number of processors 1220 of the corresponding compute sled 1202 to be allocated to compose the managed node and/or identifier(s) (IDs) of other compute sled(s) of the managed node that the processor(s) 1220 of the corresponding compute sled 1202 is configured to cooperatively execute workload with. The request may additionally include an indication of the type of workload that is to be executed.

In the illustrative embodiment, the managed node configuration determiner 1404 further includes the accelerator manager 1406, which may be embodied as hardware, firmware, software, virtualized hardware, emulated architecture, and/or a combination thereof as discussed above, is configured to determine a configuration of the accelerator 1222 of the compute sled 1202 and configure the accelerator 1222 to cooperatively execute a workload with other accelerator(s) 1222 of other compute sled(s) 1202 via the inter-processor communication. To do so, the accelerator manager 1406 is configured to determine the features of hardware components of each accelerator device 1222. For example, the accelerator manager 1406 may determine whether the accelerator 1222 is capable of communicating with another accelerator 1222 of another compute sled 1202. For example, the accelerator manager 1406 may determine whether the accelerator 1222 of the corresponding compute sled 1202 is communicatively coupled to the network switch 1204 to coordinate the inter-processor communication across multiple compute sleds 1202 to cooperatively execute a workload. If the accelerator 1222 of the corresponding compute sled 1202 is capable of the inter-processor communication, the accelerator manager 1406 may configure the accelerator 1222 in accordance with the managed node configuration.

The coherence manager 1408, which may be embodied as hardware, firmware, software, virtualized hardware, emulated architecture, and/or a combination thereof as discussed above, is configured to coordinate inter-processor communications between the compute sleds 1202 to cooperatively execute the workload. To do so, the coherence manager 1408 may perform node coherence functions to determine coherence data to be communicated to the processor(s) 1220 of other compute sled(s) 1202 of the managed node. As discussed above, the coherence data includes any modifications or updates to the working data resulted from the execution of the local working data by the processor(s) 1220 of the corresponding compute sled 1202. The accelerator 1222 may determine data that has been modified by the processor(s) 1220 of the corresponding compute sled 1202 (i.e., the coherence data) and communicates the coherence data to the other processor(s) 1220 of the managed node on other compute sled(s) 1202 via the network switch 1204 to update the local working data on the other compute sled(s) 1202 with the coherence data. It should be appreciated that, by updating the local working data on other compute sled(s) 1202 of the managed node, the coherence manager 1408 ensures that all processors 1220 of the managed node are working on the most recently updated data and to maintain the integrity of local working data on each compute sled 1202 of the managed node.

In the illustrative embodiment, the coherence manager 1408 further includes a bandwidth allocator 1410, which may be embodied as hardware, firmware, software, virtualized hardware, emulated architecture, and/or a combination thereof as discussed above, is configured to determine an amount of bandwidth required for the accelerator 1222 of the corresponding compute sled 1202 to communicate the coherence data to another accelerator 1222 of another compute sled 1202 and allocate the determined bandwidth to the corresponding compute sled 1202 to ensure that the coherence data is communicated to the other compute sled(s) 1202 of the managed node.

Figure 15:
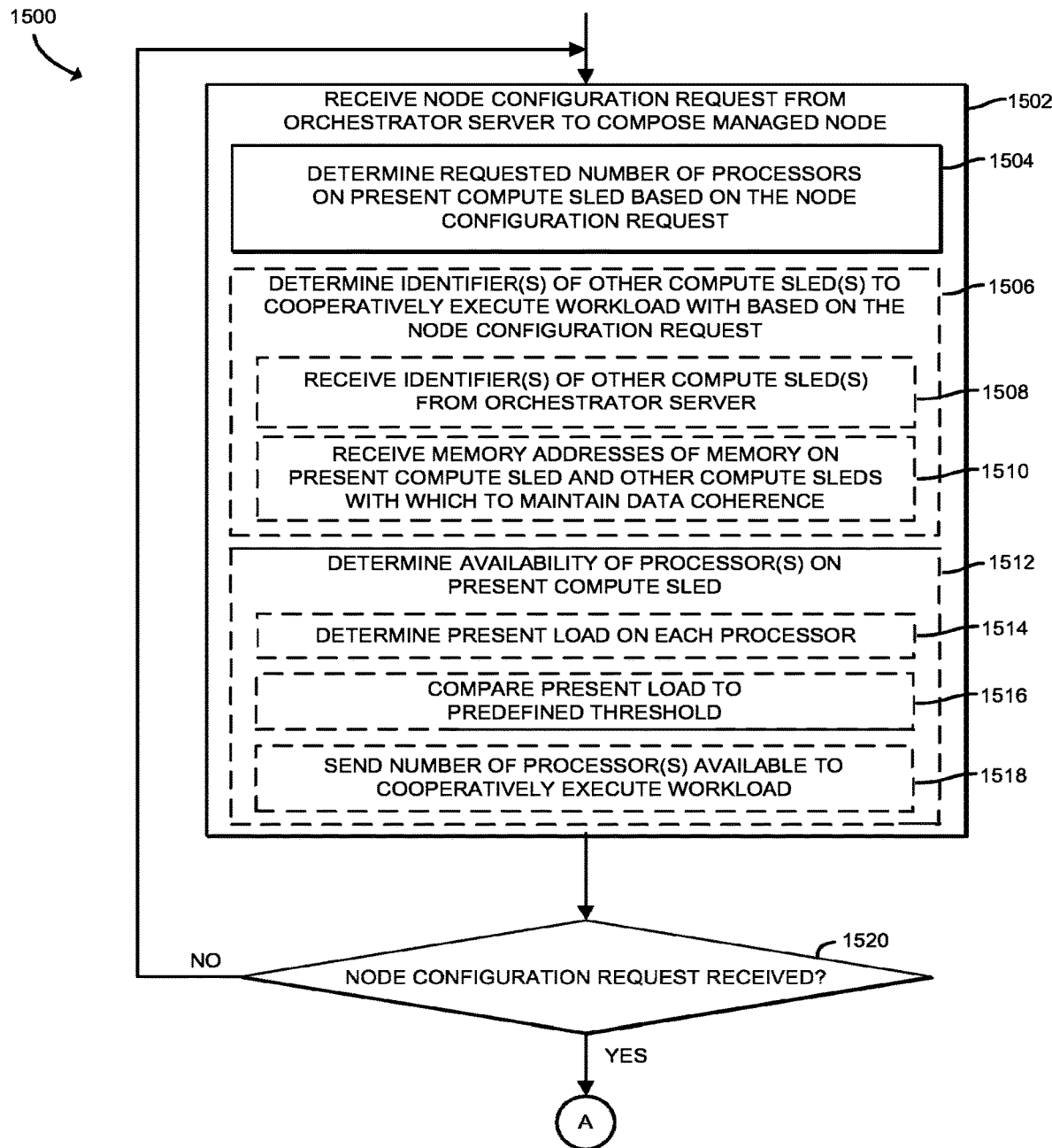
FIGS. 15-16 are a simplified flow diagram of at least one embodiment of a method that may be performed by a compute sled of FIGS. 12-14 to cooperatively execute a workload across multiple processors with another compute sled of a managed node.
Figure 16:
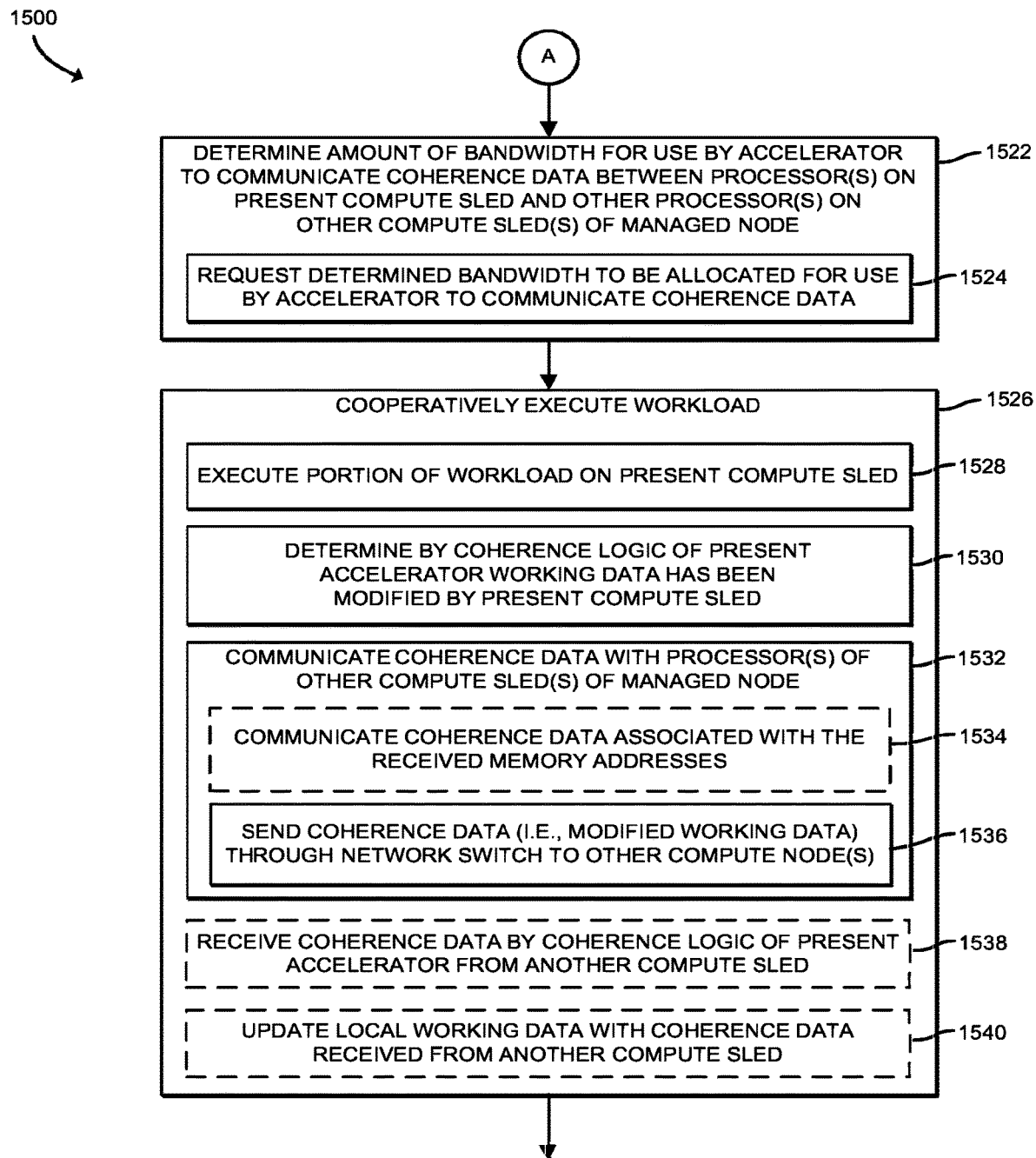

Referring now to FIGS. 15 and 16, in use, the compute sled 1202 may execute a method 1500 for cooperatively executing a workload with processor(s) from other compute sled(s) 1202 of a managed node. The method 1500 begins with block 1502 in which the compute sled 1202 receives a node configuration request from the orchestrator server 1206 to compose a managed node. As discussed above, the node configuration request from the orchestrator server 1206 includes managed node configuration data of the managed node to be composed. The node configuration request may also include an indication of the type of workload to be performed. In block 1504, the compute sled 1202 determines the requested number of processors 1220 of the corresponding compute sled 1202 to compose the managed node based on the node configuration request.

In some embodiments, in block 1506, the compute sled 1202 may determine identifier(s) of other compute sled(s) to cooperatively execute the workload with based on the node configuration request. In some embodiments, as indicated in block 1508, the compute sled 1202 may receive the identifiers from the orchestrator server 1206. Further, as indicated in block 1510, the request from the orchestrator server 1206 may identify one or more memory addresses of memory on the present compute sled 1202 and one or more memory addresses of memory on other compute sled(s) 1202 with which to maintain data coherence. In some embodiments, the memory addresses are included in the identifiers of the compute sleds (e.g., the identifiers received in block 1508).

In some embodiments, in block 1512, the compute sled 1202 may further determine, in response to receiving the node configuration request, availability of the processors 1220 on the present compute sled 1202. To do so, the compute sled 1202 may determine the present load (e.g., amount of total compute capacity that is presently being used) on each processor 1220 in block 1514 and compare the present load to a predefined threshold in block 1516 to determine whether the present load satisfies (e.g., is equal to or exceeds) a predefined threshold. If the present load satisfies the predefined threshold, the compute sled 1202 determines that the requested processor 1220 on the present compute sled is not available to be included in the managed node to cooperatively execute the workload. If, however, the present load does not satisfy the predefined threshold, the compute sled 1202 determines that the requested processor 1220 on the present compute sled 1202 is available to be included in the managed node to cooperatively execute the workload and may send a response indicative of the number of processors 1220 available to cooperatively execute the workflow in block 1518.

In block 1520, the compute sled 1202 determines whether a node configuration request has been received from the orchestrator server 1206. If the compute sled 1202 determines that a node configuration request has not been received, the method 1500 loops back to block 1502 to continue monitoring for a receipt of a node configuration request from the orchestrator server 1206. If, however, the compute sled 1202 determines that the node configuration request has been received, the method 1500 advances to block 1522 shown in FIG. 16.

In block 1522, the compute sled 1202 determines an amount of bandwidth to be used by the accelerator 1222 to communicate (e.g., send and/or receive) coherence data between the processor(s) on the present compute sled 1202 and other processor(s) 1220 on other compute sled(s) 1202 of the managed node. For example, in some embodiments, the amount of bandwidth may be determined as a function of a total number of processors 1220 that are to be included in the managed node, since more processors 1220 may indicate that there is more coherence data to be communicated between the processors 1220 within the managed node. Additionally or alternatively, the amount of bandwidth may be determined as a function of a total number of compute sleds 1202 that are to be included in the managed node, since more compute sleds 1202 may indicate that there is more coherence data to be communicated between the compute sleds 1202 within the managed node.

Additionally or alternatively, in some embodiments, the amount of bandwidth may be determined as a function of the total amount of working data to be operated on (e.g., an initial set of data provided to the compute sled 1202 when it was requested to execute the workload). For example, the compute sled 1202 may determine a direct relationship between the amount of coherence data and the initial set of data to be operated on, since more data to be operated on may indicate that more bandwidth is required for communicating coherence data. Additionally or alternatively, in other embodiments, the amount of bandwidth may be determined as a function of the type of the workload, such as whether the workload is of a type in which the working data is to be transformed from one format to another. For example, in a transcoding process, a video file may be transcoded from one compression scheme to another. In a cryptographic process, unencrypted data may be encrypted or encrypted data may be decrypted. In a compression/decompression process, uncompressed data may be compressed or compressed data may be decompressed. These types of workload may utilize a greater bandwidth for coherence data as compared to a workload in which the working set of data is not transformed.

Additionally or alternatively, in yet other embodiments, the amount of bandwidth may be determined as a function of an amount of interdependence between portions of the working data, which may impact the frequency at which the coherence data may be communicated between the compute sleds 1202. For example, if a portion of the working data that is operated on by the processors 1220 of one compute sled 1202a is not affected by changes to another portion of the working set of data that is operated on by another compute sled 1202b, the frequency of communication of the coherence data may be relatively small as compared to workloads in which the portions of the working data are dependent on each other. In other words, the modifications to be made to the set of the working data operated on by a remote compute sled 1202b may be different based on modifications made by the present compute sled 1202a to a portion of the working data. In such case, the present compute sled 1202a may determine that only a relatively small amount of bandwidth is to be used to communicate with that particular remote compute sled 1202b.

As discussed above, the coherence data includes any modifications or updates to the workload resulted from the execution of the local working data on the corresponding compute sled 1202. The coherence data is to be communicated to the other compute sled(s) of the managed node to update the local working data on the other compute sled(s) 1202 to ensure that all processors 1220 of the managed node are working on an up-to-date version of the working data set for the workload.

In block 1524, the compute sled 1202 sends a message to the orchestrator server 1206 to request the determined bandwidth to be allocated to the compute sled 1202 for use by the accelerator 1222 of the compute sled 1202 to communicate the coherence data to other compute sled(s) 1202. Such bandwidth allocation ensures that the coherence data of the compute sled 1202 may be communicated to the other compute sled(s) 1202 of the managed node without delays due to congestion in the network switch 1204.

In block 1526, the compute sled 1202 cooperatively executes the requested workload. To do so, in block 1528, the compute sled 1202 executes operations on a portion of local working data of the workload on the present compute sled 1202 using the processor(s) 1220 on the compute sled 1202. In block 1530, the accelerator 1222 of the present compute sled 1202 communicates with the coherence logic of the accelerator 1222 of the present compute sled 1202 to determine any modifications or updates to the working data (i.e., the coherence data) resulting from the execution of the local working data by the processor(s) 1220. For example, in some embodiments, the accelerator 1222 of the present compute sled 1202 may determine the coherence data by tracking the timing (e.g., timestamps) of writes to the working data made by the processors 1220 on the present compute sled 1202, identifying the locations (e.g., byte addresses of the writes), and identifying the content of the writes (e.g., the actual data written).

In block 1532, the accelerator 1222 of the present compute sled 1202 further communicates the coherence data to the processor(s) 1220 of other compute sled(s) 1202 of the managed node. For example, the accelerator 1222 of the present compute sled 1202 may communicate the coherence data by sending any updates that occurred after the last set of updates (e.g., any writes that occurred after the latest timestamp in the previous set of coherence data sent out by the present compute sled 1202). In some embodiments, the compute sled 1202 communicates coherence data associated with the received memory addresses (e.g., from block 1510), as indicated in block 1534. In the illustrative embodiment, the compute sled 1202 sends the modified working data (i.e., the coherence data) via the network switch 1204 to other compute node(s) 1202 as indicated in block 1536.

In some embodiments, the present compute sled 1202 may receive coherence data with the coherence logic unit 1340 of the present accelerator 1222 from another compute sled 1202 in block 1538 and update the local working data, as indicated in block 1540. For example, the compute sled 1202 may update the local working data by replacing data values at positions (e.g., byte addresses) in the local copy of the working data with the content of the writes operations indicated in the received coherence data, in the order of the timestamps indicated in the received coherence data.

EXAMPLES

Illustrative examples of the technologies disclosed herein are provided below. An embodiment of the technologies may include any one or more, and any combination of, the examples described below.

Example 1 includes a compute sled comprising a memory; one or more processors connected to the memory; and an accelerator comprising a coherence logic unit, wherein the coherence logic unit is to (i) receive a node configuration request to execute a workload, wherein the node configuration request identifies the compute sled and a second compute sled to be included in a managed node, (ii) modify, with the one or more processors of the compute sled, a portion of local working data associated with the workload on the compute sled in the memory, (iii) determine coherence data indicative of the modification made by the one or more processors of the compute sled to the local working data in the memory, and (iv) send the coherence data to the second compute sled of the managed node.

Example 2 includes the subject matter of Example 1, and wherein to receive the node configuration request comprises to receive memory addresses of memory on the compute sled and the second compute sled to share the coherence data.

Example 3 includes the subject matter of any of Examples 1 and 2, and wherein the coherence logic unit is further to determine, in response to a receipt of the node configuration request, an availability of the one or more processors of the compute sled.

Example 4 includes the subject matter of any of Examples 1-3, and wherein to determine the availability of the one or more processors of the compute sled comprises to determine whether a present load on each processor exceeds a threshold; and send a response indicative of the number of processors having a present load that does not exceed the threshold as being available to cooperatively execute the workload.

Example 5 includes the subject matter of any of Examples 1-4, and wherein the coherence logic unit is further to receive coherence data from the second compute sled; and update the local working data with the coherence data received from the second compute sled.

Example 6 includes the subject matter of any of Examples 1-5, and wherein the coherence logic unit is further to determine an amount of bandwidth to communicate with another coherence logic unit of the second compute sled.

Example 7 includes the subject matter of any of Examples 1-6, and wherein to determine the amount of bandwidth comprises to determine an amount of bandwidth as a function of a total number of processors that are to be included in the managed node.

Example 8 includes the subject matter of any of Examples 1-7, and wherein to determine the amount of bandwidth comprises to determine an amount of bandwidth as a function of a total number of compute sleds that are to be included in the managed node.

Example 9 includes the subject matter of any of Examples 1-8, and wherein to determine the amount of bandwidth comprises to determine an amount of bandwidth as a function of a size of the local working data to be operated on.

Example 10 includes the subject matter of any of Examples 1-9, and wherein to determine the amount of bandwidth comprises to determine an amount of bandwidth as a function of a type of the workload.

Example 11 includes the subject matter of any of Examples 1-10, and wherein the coherence logic unit is further to send a request to a network switch for the determined amount of bandwidth.

Example 12 includes the subject matter of any of Examples 1-11, and wherein to send the coherence data to the second compute sled of the managed node comprises to send the coherence data associated with a memory address identified in the node configuration request.

Example 13 includes the subject matter of any of Examples 1-12, and wherein the coherence logic unit is a kernel of a field programmable gate array.

Example 14 includes the subject matter of any of Examples 1-13, and wherein the node configuration request identifies a number of processors of the compute sled to be included in the managed node.

Example 15 includes a method comprising receiving, by a compute sled, a node configuration request to execute a workload, wherein the node configuration request identifies the compute sled and a second compute sled to be included in a managed node; modifying, by one or more processors of the compute sled, a portion of local working data associated with the workload in a memory of the compute sled; determining, by the compute sled, coherence data indicative of the modification made by the one or more processors of the compute sled to the local working data in the memory; and sending, by the compute sled, the coherence data to the second compute sled of the managed node.

Example 16 includes the subject matter of Example 15, and wherein receiving the node configuration request comprises receiving, by the compute sled, memory addresses of memory on the compute sled and the second compute sled to share the coherence data.

Example 17 includes the subject matter of any of Examples 15 and 16, and further including determining, by the compute sled and in response to a receipt of the node configuration request, an availability of the one or more processors of the compute sled.

Example 18 includes the subject matter of any of Examples 15-17, and wherein determining the availability of the one or more processors of the compute sled comprises determining whether a present load on each processor exceeds a threshold; and sending a response indicative of the number of processors having a present load that does not exceed the threshold as being available to cooperatively execute the workload.

Example 19 includes the subject matter of any of Examples 15-18, and further including receiving, by the compute sled, coherence data from the second compute sled; and updating, by the compute sled, the local working data with the coherence data received from the second compute sled.

Example 20 includes the subject matter of any of Examples 15-19, and further including determining, by the compute sled, an amount of bandwidth to communicate with a coherence logic unit of the second compute sled.

Example 21 includes the subject matter of any of Examples 15-20, and wherein determining the amount of bandwidth comprises determining an amount of bandwidth as a function of a total number of processors that are to be included in the managed node.

Example 22 includes the subject matter of any of Examples 15-21, and wherein determining the amount of bandwidth comprises determining an amount of bandwidth as a function of a total number of compute sleds that are to be included in the managed node.

Example 23 includes the subject matter of any of Examples 15-22, and wherein determining the amount of bandwidth comprises determining an amount of bandwidth as a function of a size of the local working data to be operated on.

Example 24 includes the subject matter of any of Examples 15-23, and wherein determining the amount of bandwidth comprises determining an amount of bandwidth as a function of a type of the workload.

Example 25 includes the subject matter of any of Examples 15-24, and further including sending, by the compute sled, a request to a network switch for the determined amount of bandwidth.

Example 26 includes the subject matter of any of Examples 15-25, and wherein sending the coherence data to the second compute sled of the managed node comprises sending, by the compute sled, the coherence data associated with a memory address identified in the node configuration request.

Example 27 includes the subject matter of any of Examples 15-26, and wherein determining the coherence data comprises determining the coherence data with a field programmable gate array of the compute sled.

Example 28 includes the subject matter of any of Examples 15-27, and further including receiving, by the compute sled, coherence data from the second compute sled; and updating, by a field programmable gate array of the compute sled, the local working data with the coherence data received from the second compute sled.

Example 29 includes one or more machine-readable storage media comprising a plurality of instructions stored thereon that, in response to being executed, cause a compute sled to perform the method of any of Examples 15-28.

Example 30 includes a compute sled comprising means for performing the method of any of Examples 15-28.

Example 31 includes a compute sled comprising a memory; one or more processors connected to the memory; and an accelerator comprising a coherence logic unit circuitry, wherein the coherence logic unit circuitry is to (i) receive a node configuration request to execute a workload, wherein the node configuration request identifies the compute sled and a second compute sled to be included in a managed node, (ii) modify, with the one or more processors of the compute sled, a portion of local working data associated with the workload on the compute sled in the memory, (iii) determine coherence data indicative of the modification made by the one or more processors of the compute sled to the local working data in the memory, and (iv) send the coherence data to the second compute sled of the managed node.

Example 32 includes the subject matter of Example 31, and wherein to receive the node configuration request comprises to receive memory addresses of memory on the compute sled and the second compute sled to share the coherence data.

Example 33 includes the subject matter of any of Examples 31 and 32, and wherein the coherence logic unit circuitry is further to determine, in response to a receipt of the node configuration request, an availability of the one or more processors of the compute sled.

Example 34 includes the subject matter of any of Examples 31-33, and wherein to determine the availability of the one or more processors of the compute sled comprises to determine whether a present load on each processor exceeds a threshold; and send a response indicative of the number of processors having a present load that does not exceed the threshold as being available to cooperatively execute the workload.

Example 35 includes the subject matter of any of Examples 31-34, and wherein the coherence logic unit circuitry is further to receive coherence data from the second compute sled; and update the local working data with the coherence data received from the second compute sled.

Example 36 includes the subject matter of any of Examples 31-35, and wherein the coherence logic unit circuitry is further to determine an amount of bandwidth to communicate with another coherence logic unit circuitry of the second compute sled.

Example 37 includes the subject matter of any of Examples 31-36, and wherein to determine the amount of bandwidth comprises to determine an amount of bandwidth as a function of a total number of processors that are to be included in the managed node.

Example 38 includes the subject matter of any of Examples 31-37, and wherein to determine the amount of bandwidth comprises to determine an amount of bandwidth as a function of a total number of compute sleds that are to be included in the managed node.

Example 39 includes the subject matter of any of Examples 31-38, and wherein to determine the amount of bandwidth comprises to determine an amount of bandwidth as a function of a size of the local working data to be operated on.

Example 40 includes the subject matter of any of Examples 31-39, and wherein to determine the amount of bandwidth comprises to determine an amount of bandwidth as a function of a type of the workload.

Example 41 includes the subject matter of any of Examples 31-40, and wherein the coherence logic unit circuitry is further to send a request to a network switch for the determined amount of bandwidth.

Example 42 includes the subject matter of any of Examples 31-41, and wherein to send the coherence data to the second compute sled of the managed node comprises to send the coherence data associated with a memory address identified in the node configuration request.

Example 43 includes the subject matter of any of Examples 31-42, and wherein the coherence logic unit circuitry is a kernel of a field programmable gate array.

Example 44 includes the subject matter of any of Examples 31-43, and wherein the node configuration request identifies a number of processors of the compute sled to be included in the managed node.

Example 45 includes a compute sled comprising circuitry for receiving a node configuration request to execute a workload, wherein the node configuration request identifies the compute sled and a second compute sled to be included in a managed node; means for modifying, by one or more processors of the compute sled, a portion of local working data associated with the workload in a memory of the compute sled; means for determining coherence data indicative of the modification made by the one or more processors of the compute sled to the local working data in the memory; and means for sending the coherence data to the second compute sled of the managed node.

Example 46 includes the subject matter of Example 45, and wherein the means for receiving the node configuration request comprises means for receiving memory addresses of memory on the compute sled and the second compute sled to share the coherence data.

Example 47 includes the subject matter of any of Examples 45 and 46, and further including means for determining, in response to a receipt of the node configuration request, an availability of the one or more processors of the compute sled.

Example 48 includes the subject matter of any of Examples 45-47, and wherein the means for determining the availability of the one or more processors of the compute sled comprises means for determining whether a present load on each processor exceeds a threshold; and means for sending a response indicative of the number of processors having a present load that does not exceed the threshold as being available to cooperatively execute the workload.

Example 49 includes the subject matter of any of Examples 45-48, and further including means for receiving coherence data from the second compute sled; and means for updating the local working data with the coherence data received from the second compute sled.

Example 50 includes the subject matter of any of Examples 45-49, and further including means for determining an amount of bandwidth to communicate with a coherence logic unit of the second compute sled.

Example 51 includes the subject matter of any of Examples 45-50, and wherein the means for determining the amount of bandwidth comprises means for determining an amount of bandwidth as a function of a total number of processors that are to be included in the managed node.

Example 52 includes the subject matter of any of Examples 45-51, and wherein the means for determining the amount of bandwidth comprises means for determining an amount of bandwidth as a function of a total number of compute sleds that are to be included in the managed node.

Example 53 includes the subject matter of any of Examples 45-52, and wherein the means for determining the amount of bandwidth comprises means for determining an amount of bandwidth as a function of a size of the local working data to be operated on.

Example 54 includes the subject matter of any of Examples 45-53, and wherein the means for determining the amount of bandwidth comprises means for determining an amount of bandwidth as a function of a type of the workload.

Example 55 includes the subject matter of any of Examples 45-54, and further including circuitry for sending, by the compute sled, a request to a network switch for the determined amount of bandwidth.

Example 56 includes the subject matter of any of Examples 45-55, and wherein the means for sending the coherence data to the second compute sled of the managed node comprises means for sending the coherence data associated with a memory address identified in the node configuration request.

Example 57 includes the subject matter of any of Examples 45-56, and wherein the means for determining the coherence data comprises means for determining the coherence data with a field programmable gate array of the compute sled.

Example 58 includes the subject matter of any of Examples 45-57, and further including means for receiving coherence data from the second compute sled; and means for updating, with a field programmable gate array of the compute sled, the local working data with the coherence data received from the second compute sled.

What is claimed is:

1. A cloud computing system for use in providing at least one cloud-based service associated with executing at least one workload, execution of the at least one workload being associated with machine-learning, the cloud computing system comprising:
   compute resources comprising at least one central processing unit and memory circuitry;
   accelerator resources comprising graphics accelerator circuitry and/or field programmable gate array circuitry; and
   management resources for use in allocating and configuring, at least in part, the compute resources and the accelerator resources for use in the execution of the at least one workload;
   wherein:
      the accelerator resources are configurable for use in implementing neural network operations associated with the execution of the at least one workload;
      the execution of the at least one workload is to result in modified workload-related data;
      the cloud computing system is configurable to provide the modified workload-related data to at least certain of the compute resources and/or the accelerator resources to maintain data coherency with regard to the workload-related data; and
      the cloud computing system is configurable to dynamically allocate, based upon resource utilization data, the compute resources and/or the accelerator resources for use in the execution of the at least one workload.

2. The cloud computing system of claim 1, wherein:
the cloud computing system is configurable to allocate network data communication bandwidth and/or quality of service associated with the execution of at least one workload; and
the cloud computing system is configurable to dynamically reallocate, based upon the resource utilization data, the compute resources and/or the accelerator resources.

3. The cloud computing system of claim 1, wherein:
the cloud computing system is configurable to dynamically reallocate, based upon resource utilization prediction data, the compute resources and/or the accelerator resources; and
the cloud computing system further comprises storage resources for use in association with the compute resources and/or the accelerator resources.

4. The cloud computing system of claim 1, wherein:
the at least one workload comprises at least one virtual machine-based workload and/or at least one container-based workload;
the accelerator resources are configurable to comprise at least one rack server;
the at least one rack server comprises the graphics accelerator circuitry and/or field programmable gate array circuitry; and
the at least one rack server is to be communicatively coupled to the management resources via a network.

5. One or more non-transitory machine-readable media storing instructions for being executed by one or more machines, the one or more machines being associated with a cloud computing system, the cloud computing system being for use in providing at least one cloud-based service associated with at least one workload, execution of the at least one workload being associated with machine-learning, the instructions, when executed by the one or more machines, resulting in the cloud computing system being configurable to perform operations comprising:
configuring compute resources comprising at least one central processing unit and memory circuitry;
configuring accelerator resources comprising graphics accelerator circuitry and/or field programmable gate array circuitry; and
allocating, by management resources, the compute resources and the accelerator resources for use in the execution of the at least one workload;
wherein:
the accelerator resources are configurable for use in implementing neural network operations associated with the execution of the at least one workload;
the execution of the at least one workload is to result in modified workload-related data;
the cloud computing system is configurable to provide the modified workload-related data to at least certain of the compute resources and/or the accelerator resources to maintain data coherency with regard to the workload-related data; and
the cloud computing system is configurable to dynamically allocate, based upon resource utilization data, the compute resources and/or the accelerator resources for use in the execution of the at least one workload.

6. The one or more non-transitory machine-readable media of claim 5, wherein:
the cloud computing system is configurable to allocate network data communication bandwidth and/or quality of service associated with the execution of the at least one workload; and
the cloud computing system is configurable to dynamically reallocate, based upon the resource utilization data, the compute resources and/or the accelerator resources.

7. The one or more non-transitory machine-readable media of claim 5, wherein:
the cloud computing system is configurable to dynamically reallocate, based upon resource utilization prediction data, the compute resources and/or the accelerator resources; and
the cloud computing system further comprises storage resources for use in association with the compute resources and/or the accelerator resources.

8. The one or more non-transitory machine-readable media of claim 5, wherein:
the at least one workload comprises at least one virtual machine-based workload and/or at least one container-based workload;
the accelerator resources are configurable to comprise at least one rack server;
the at least one rack server comprises the graphics accelerator circuitry and/or field programmable gate array circuitry; and
the at least one rack server is to be communicatively coupled to the management resources via a network.

9. A method implemented, at least in part, using a cloud computing system, the cloud computing system being for use in providing at least one cloud-based service associated with at least one workload, execution of the at least one workload being associated with machine-learning, the method comprising:
configuring compute resources comprising at least one central processing unit and memory circuitry;
configuring accelerator resources comprising graphics accelerator circuitry and/or field programmable gate array circuitry; and
allocating, by management resources, the compute resources and the accelerator resources for use in the execution of the at least one workload;
wherein:
the accelerator resources are configurable for use in implementing neural network operations associated with the execution of the at least one workload;
the execution of the at least one workload is to result in modified workload-related data;
the cloud computing system is configurable to provide the modified workload-related data to at least certain of the compute resources and/or the accelerator resources to maintain data coherency with regard to the workload-related data; and
the cloud computing system is configurable to dynamically allocate, based upon resource utilization data, the compute resources and/or the accelerator resources for use in the execution of the at least one workload.

10. The method of claim 9, wherein:
the cloud computing system is configurable to allocate network data communication bandwidth and/or quality of service associated with the execution of the at least one workload; and the cloud computing system is configurable to dynamically reallocate, based upon the resource utilization data, the compute resources and/or the accelerator resources.

11. The method of claim 9, wherein:

the cloud computing system is configurable to dynamically reallocate, based upon resource utilization prediction data, the compute resources and/or the accelerator resources; and the cloud computing system further comprises storage resources for use in association with the compute resources and/or the accelerator resources.

12. The method of claim 9, wherein:

the at least one workload comprises at least one virtual machine-based workload and/or at least one container-based workload;

the accelerator resources are configurable to comprise at least one rack server;

the at least one rack server comprises the graphics accelerator circuitry and/or field programmable gate array circuitry; and the at least one rack server is to be communicatively coupled to the management resources via a network.

\* \* \* \* \*